US007290177B2

(12) United States Patent
Kagawa

(10) Patent No.: US 7,290,177 B2
(45) Date of Patent: Oct. 30, 2007

(54) NETWORK COMMUNICATION TERMINAL APPARATUS WITH CAPABILITY OF OUTPUTTING ERROR OCCURRENCE INDICATION

(75) Inventor: Tetsuya Kagawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 520 days.

(21) Appl. No.: 10/776,875

(22) Filed: Feb. 11, 2004

(65) Prior Publication Data

US 2005/0105702 A1 May 19, 2005

(30) Foreign Application Priority Data

Feb. 14, 2003 (JP) ............................. 2003-037193

(51) Int. Cl.
*G06F 11/00* (2006.01)
(52) U.S. Cl. ........................................... 714/39; 714/47
(58) Field of Classification Search ................ 714/37, 714/38, 39, 47, 48
See application file for complete search history.

(56) References Cited

U.S. PATENT DOCUMENTS

| | | | |
|---|---|---|---|
| 4,866,712 A | | 9/1989 | Chao |
| 5,097,187 A | | 3/1992 | Koshiishi et al. |
| 5,208,814 A | | 5/1993 | Ulrich et al. |
| 5,452,474 A | | 9/1995 | Kagawa |
| 5,597,311 A | | 1/1997 | Yanagida et al. |
| 5,608,545 A | | 3/1997 | Kagawa |
| 5,668,944 A | * | 9/1997 | Berry ........................... 714/47 |
| 5,680,541 A | * | 10/1997 | Kurosu et al. ................ 714/26 |
| 5,775,918 A | | 7/1998 | Yanagida et al. |
| 5,822,084 A | | 10/1998 | Hwang |
| 5,995,239 A | | 11/1999 | Kagawa et al. |
| 6,160,637 A | | 12/2000 | Kagawa |
| 6,222,645 B1 | | 4/2001 | Kagawa |
| 6,279,826 B1 | | 8/2001 | Gill et al. |
| 6,574,012 B1 | | 6/2003 | Kagawa |
| 6,594,784 B1 | * | 7/2003 | Harper et al. .................. 714/47 |
| 6,629,266 B1 | * | 9/2003 | Harper et al. .................. 714/38 |
| 7,006,947 B2 | * | 2/2006 | Tryon et al. ................. 702/183 |
| 7,020,595 B1 | * | 3/2006 | Adibhatla et al. .............. 703/7 |
| 7,036,049 B2 | * | 4/2006 | Ali et al. ....................... 714/47 |

(Continued)

FOREIGN PATENT DOCUMENTS

JP 2001-358883 A 12/2001

(Continued)

OTHER PUBLICATIONS

Jun. 7, 2004 Communication and European Search Report in connection with European Application No. EP 04 25 0761 which corresponds to the above-identified application.

*Primary Examiner*—Scott Baderman
*Assistant Examiner*—Tim Bonura
(74) *Attorney, Agent, or Firm*—Cooper & Dunham, LLP

(57) ABSTRACT

A network communication terminal apparatus compares a successive occurrence count number and a set threshold occurrence number of each error related to network communication operations, and when an error of which the successive occurrence count number is equal to the set threshold occurrence number is detected, an indication of the occurrence of this error is output to the user. In this way, the network communication terminal apparatus is able to accurately provide error indications that are relevant so as to secure reliability in the network communication operations of the apparatus while disregarding irrelevant error occurrences to avoid needless distractions.

12 Claims, 23 Drawing Sheets

U.S. PATENT DOCUMENTS

| | | |
|---|---|---|
| 7,076,695 B2 * | 7/2006 | McGee et al. .............. 714/47 |
| 2001/0028473 A1 | 10/2001 | Yamasaki et al. |
| 2002/0044302 A1 | 4/2002 | Kagawa |
| 2002/0048048 A1 | 4/2002 | Kagawa |
| 2002/0093698 A1 | 7/2002 | Kagawa |
| 2002/0120700 A1 | 8/2002 | Tamura |
| 2002/0133757 A1 * | 9/2002 | Bertram et al. .............. 714/47 |
| 2002/0174384 A1 * | 11/2002 | Graichen et al. ............ 714/37 |
| 2002/0178389 A1 | 11/2002 | Satoh |
| 2002/0186427 A1 | 12/2002 | Orikasa |
| 2003/0030847 A1 | 2/2003 | Amemiya et al. |
| 2003/0065986 A1 * | 4/2003 | Fraenkel et al. ............ 714/47 |
| 2003/0070120 A1 * | 4/2003 | Michael et al. .............. 714/38 |
| 2003/0079160 A1 * | 4/2003 | McGee et al. ............... 714/39 |
| 2003/0081263 A1 | 5/2003 | Satoh et al. |
| 2004/0078683 A1 * | 4/2004 | Buia et al. .................... 714/37 |

FOREIGN PATENT DOCUMENTS

| | | |
|---|---|---|
| JP | 2002125090 A | 4/2002 |
| JP | 2002-204330 A | 7/2002 |

* cited by examiner

FIG.6

| ERROR NUMBER/ERROR CONTENT CHARACTER STRING STORAGE UNIT | |
|---|---|
| ERROR NUMBER | ERROR CONTENT CHARACTER STRING |
| 01 | DNS SERVER CANNOT BE FOUND |
| 02 | POP SERVER CANNOT BE FOUND |
| 03 | SMTP SERVER CANNOT BE FOUND |
| 04 | CANNOT LOGIN TO POP SERVER |
| 05 | LINE DISCONNTECTED DURING POP SERVER CONNECTION |
| 06 | SMTP SERVER IS BUSY |
| 07 | LINE DISCONNEDTED DURING SMTP SERVER CONNECTION |
| ⋮ | ⋮ |

FIG.7

| ERROR NUMBER/THRESHOLD OCCURRENCE NUMBER SETTING UNIT | |
|---|---|
| ERROR NUMBER | THRESHOLD OCCURRENCE NUMBER |
| 01 | 3 |
| 02 | 2 |
| 03 | 2 |
| 04 | 4 |
| 05 | 2 |
| 06 | 1 |
| 07 | 4 |
| ⋮ | ⋮ |

FIG.8

| ERROR NUMBER/OCCURRENCE NUMBER STORAGE UNIT | |
|---|---|
| ERROR NUMBER | OCCURRENCE NUMBER |
| 01 | 2 |
| 02 | 1 |
| 03 | 0 |
| 04 | 0 |
| 05 | 0 |
| 06 | 0 |
| 07 | 1 |
| ⋮ | ⋮ |

| ERROR OCCURRENSIS STORAGE UNIT ||
|---|---|
| ERROR OCCURRENCE TIME | ERROR NUMBER |
| 2003/02/05 11:00 | 01 |
| 2003/02/05 13:15 | 02 |
| 2003/02/05 14:30 | 03 |
| 2003/02/05 16:45 | 04 |
| 2003/02/06 01:30 | 05 |
| ⋮ | ⋮ |

FIG.13

ERROR HAS OCCURRED
IN NETWORK COMMUNICATION

ERROR GROUP NUMBER : 04

ERROR CONTENT : CANNOT LOGIN TO POP SERVER

PRESS [ YES ] AFTER CONFIRMATION

FIG.14

| | ─3b |
|---|---|
| ERROR NUMBER/CORRESPONDING ERROR GROUP STORAGE UNIT | |
| ERROR NUMBER | CORRESPONDING ERROR GROUP NUMBER |
| 01 | 00 |
| 02 | 01 |
| 03 | 02 |
| 04 | 01 |
| 05 | 01 |
| 06 | 02 |
| 07 | 02 |
| ⋮ | ⋮ |

| 00 | NO CORRESPONDING GROUP |
|---|---|

FIG.15

| | ─3c |
|---|---|
| ERROR GROUP NUMBER/ERROR GROUP CONTENT CHARACTER STRING STORAGE UNIT | |
| ERROR GROUP NUMBER | ERROR GROUP CONTENT CHARACTER STRING |
| 01 | MAIL RECEPTION (POP) RELATED ERROR |
| 02 | MAIL TRANSMISSION (SMTP) RELATED ERROR |
| ⋮ | ⋮ |

FIG.16

| ERROR GROUP NUMBER/ THRESHOLD OCCURRENCE NUMBER SETTING UNIT | |
|---|---|
| ERROR GROUP NUMBER | THRESHOLD OCCURRENCE NUMBER |
| 01 | 3 |
| 02 | 2 |
| ⋮ | ⋮ |

| ERROR GROUP NUMBER/ OCCURRENCE NUMBER STORAGE UNIT | |
|---|---|
| ERROR GROUP NUMBER | OCCURRENCE NUMBER |
| 01 | 1 |
| 02 | 0 |
| ⋮ | ⋮ |

4d

NETWORK COMMUNICATION TERMINAL APPARATUS WITH CAPABILITY OF OUTPUTTING ERROR OCCURRENCE INDICATION

BACKGROUND OF THE INVENTION

1. Field of the Invention

The present invention relates generally to a network communication terminal apparatus such as an Internet facsimile apparatus, and particularly to a network communication terminal apparatus that is capable of outputting an error occurrence indication of an error relating to the network communication operation to a user while exchanging data with a counterpart apparatus via a network.

2. Description of the Related Art

In a conventional network communication terminal apparatus such as a conventional Internet facsimile apparatus, sending or receiving an image is realized by attaching a file to an e-mail message.

Accordingly, connection with a mail server is periodically established in order to check whether there are any received e-mail messages and access the received e-mail, or to send e-mail.

In such a communication established via a network, a mail server lies between the present Internet facsimile apparatus and the counterpart apparatus corresponding to the destination of document data being sent or the sender of document data being received, and thereby, unlike the G3 facsimile apparatus that realizes direct communication with a counterpart apparatus via a phone line, errors are prone to occur, and various propositions have been made in the prior art to secure communications reliability. Examples of such measures are disclosed in Japanese Laid-Open Patent Publication 2001-358883, Japanese Laid-Open Patent Publication 2002-125090, and Japanese Laid-Open Patent Publication 2002-204330.

In such prior art examples, reliability is secured by immediately signaling to the user that an error has occurred by displaying an error indication each time a network communication-related error occurs, that is, when trouble such as failure to establish a connection with the mail server occurs in network communications, the error indication is displayed until the problem is resolved.

However, there are cases such as when ADSL is used for network connection, for example, where connection may oftentimes be disturbed but may easily be reestablished, or where the server may temporarily be unable to respond due to overloading but may easily be restored back to normal.

Also, when exchanging document data via a network using e-mail, for example, oftentimes, the user may not be too concerned even when there is a slight delay in the arrival of transmitted document data at the counterpart apparatus side or the arrival of received document data at the present apparatus.

Thus, the user may be annoyed by the fact that an error indication is displayed every time an error occurs even for network communications-related errors of which the present apparatus is not the cause, and further, the user may be misguided into believing that there is a problem in his/her own apparatus.

SUMMARY OF THE INVENTION

The present invention has been conceived in consideration of the problems of the related art and its object is to provide a network communication terminal apparatus that is capable of providing error occurrence indications that are relevant to a user without debasing the reliability in the network communications operation of the apparatus.

Specifically, the present invention in one aspect provides a network communication terminal apparatus that is adapted to exchange data with a counterpart apparatus via a network, and output an indication of an error occurrence that is to be recognized by a user when one or more of a plurality of types of errors relating to a network communication operation occur, the network communication terminal apparatus including:

an error/threshold occurrence number setting unit for setting and storing, for each type of the types of errors, a successive occurrence threshold number corresponding to a number of times the type of error is to occur successively before an indication of an error occurrence of the type of error is output;

an error/occurrence number counting unit for counting, for each type of the types of errors, a number of successive occurrences of the type of error; and an error occurrence output unit for outputting an indication of an error occurrence of a specified type of error in a case where the successive occurrence number of each type of error counted by the error/occurrence number counting unit and the threshold occurrence number of each type of error set by the error/threshold occurrence number setting unit are compared to find that the successive occurrence number of the specified type of error is equal to the threshold occurrence number of the specified type of error.

In the present invention, an error occurrence indication is not made to the user each time an error related to the network communication operation occurs; rather, an error occurrence indication to the user is not made until the error occurs successively for a predetermined number of times. Also, the predetermined number of times may be individually set for each type of error so that adjustments may be made according to the network line environment or the server environment, for example. Accordingly, flexibility can be provided in setting the predetermined number, and, for example, a small value may be set for a grave error whereas a large value may be set for trivial errors that can be easily resolved without taking any heed thereof. Thus, by accurately providing error indications that are relevant for securing reliability in the network communication, operability of the apparatus may be greatly improved.

According to another embodiment of the present invention, a network communication terminal apparatus, adapted to exchange data with a counterpart apparatus via a network, and output an indication of an error occurrence that is to be recognized by a user when one or more of a plurality of types of errors relating to a network communication operation occur, includes:

an error group/threshold occurrence number setting unit for dividing the types of errors into a plurality of error groups by categorically grouping the types of errors and setting and storing, for each group of the error groups, a successive occurrence threshold number corresponding to a number of times one or more types of errors belonging to the error group are to occur successively before an indication of an error occurrence of the error group is output;

an error/occurrence number counting unit for counting, for each type of error, a number of successive occurrences of the type of error; and an error group occurrence output unit for outputting an indication of an error occurrence of a specified error group in a case where the successive occurrence number of each error group counted by the error/occurrence number counting unit, and the threshold occurrence number of each error group set by the error/threshold occurrence number setting unit are compared to find that the successive occurrence number of the specified error group is equal to the threshold occurrence number of the specified error group.

In the present embodiment, errors are categorically grouped into error groups so that setting adjustments according to environmental conditions may be easily made, and thus, the operability of the apparatus may be improved.

According to another embodiment of the present invention, a network communication terminal apparatus, adapted to exchange data with a counterpart apparatus via a network, and output an indication of an error occurrence that is to be recognized by a user when one or more of a plurality of types of errors relating to a network communication operation occur, includes:

a specified error/threshold occurrence number setting unit for setting and storing a predetermined successive occurrence threshold number for a specified type of the types of errors, the predetermined successive occurrence number corresponding to a number of times the specified type of error is to occur successively before an indication of an error occurrence of the specified type of error is output;

a specified error/occurrence number counting unit for counting a number of successive occurrences of the specified type of error; and a specified error occurrence output unit for outputting the indication of the error occurrence of the specified type of error in a case where the successive occurrence number of the specified type of error counted by the specified error/occurrence number counting unit and the threshold occurrence number of the specifies type of error set by the specified error/threshold occurrence number setting unit are compared to find that the successive occurrence number is equal to the threshold occurrence number.

In the present invention, an indication of an occurrence of a specified error is arranged to be output after this specified error occurs successively for a preset number of times. Thus, in an environment where a particular error is likely to occur on a frequent basis, the error occurrence indication system may be easily adjusted so that operability of the apparatus may be improved.

According to another embodiment of the present invention, a network communication terminal apparatus, adapted to exchange data with a counterpart apparatus via a network, and output an indication of an error occurrence that is to be recognized by a user when one or more of a plurality of types of errors relating to a network communication operation occur, includes:

an unspecified error/threshold occurrence number setting unit for setting and storing a predetermined successive occurrence threshold number corresponding to a number of times unspecified types of the types of errors are to occur successively before the indication of the error occurrence is output;

an unspecified error/occurrence number counting unit for counting a number of successive occurrences of the unspecified types of errors; and an unspecified error occurrence output unit for outputting the indication of the error occurrence in a case where the successive occurrence number of the unspecified types of errors counted by the unspecified error/occurrence number counting unit and the threshold occurrence number of the unspecified types of errors set by the unspecified error/threshold occurrence number setting unit are compared to find that the successive occurrence number is equal to the threshold occurrence number.

In the present embodiment, the various types of errors related to the network communication operation are not distinguished, and they are collectively handled as errors related to the network communication operation. Thus, error occurrence indications may be made for random errors that may occur upon using various protocols and applications so that operability of the apparatus may be improved. In other words, when numerous applications are used, it is more likely for a plurality of errors to occur at the same time. Thus, the present invention is suitable for use in cases where error indication based on the occurrence of a particular type of error is difficult.

In a further embodiment, the network communication terminal apparatuses of the present invention may include:

an error occurrence hysteresis storage unit for storing error occurrence hysteresis information for each type of error; and an error occurrence hysteresis output unit for outputting the stored error occurrence hysteresis information.

In the present invention, an error occurrence is recorded regardless of whether an error indication is to be made so that the error occurrence status may be easily determined, and the recorded contents may be referred to during a maintenance operation, for example. In this way, the determination of the setting value for the threshold occurrence number may be facilitated, and maintenance qualities of the apparatus may be improved.

The present invention in another aspect provides a method of providing an error occurrence indication to a user in a network communication terminal apparatus that is adapted to exchange data with a counterpart apparatus via a network, the error occurrence indication being output when one or more of a plurality of types of errors relating to a network communication operation occur, the method including:

comparing a successive occurrence count number and a predetermined threshold occurrence number of each of the types of errors; and outputting an error occurrence indication of a specified type of error of which the successive occurrence count number is determined to be equal to the predetermined threshold occurrence number in the comparing step.

According to another embodiment of the present invention, a method is provided for providing an error occurrence indication to a user in a network communication terminal apparatus that is adapted to exchange data with a counterpart apparatus via a network, the error occurrence indication being output when one or more of a plurality of types of errors relating to a network communication operation occur, the method including:

comparing a successive occurrence count number and a predetermined threshold occurrence number of each of error groups into which the types of errors are categorically grouped; and outputting an error occurrence indication of a specified error group of which the successive occurrence count number is determined to be equal to the predetermined threshold occurrence number in the comparing step.

According to another embodiment, a method is provided for providing an error occurrence indication to a user in a network communication terminal apparatus that is adapted to exchange data with a counterpart apparatus via a network, the error occurrence indication being output when one or more of a plurality of types of errors relating to a network communication operation occur, the method including:

comparing a successive occurrence count number and a predetermined threshold occurrence number of a specified type of error; and outputting an error occurrence indication of the specified type of error when it is determined in the comparing step that the successive occurrence count number is equal to the predetermined threshold occurrence number.

According to another embodiment, a method is provided for providing an error occurrence indication to a user in a network communication terminal apparatus that is adapted to exchange data with a counterpart apparatus via a network, the error occurrence indication being output when one or more errors relating to a network communication operation occur, the method including:

comparing a successive occurrence count number and a predetermined threshold occurrence number of the errors; and outputting the error occurrence indication when it is determined in the comparing step that the successive occurrence count number is equal to the predetermined threshold occurrence number.

BRIEF DESCRIPTION OF THE DRAWINGS

FIG. 6 is a table illustrating specific storage contents of an error number/error content character string storage unit of the ROM;

FIG. 7 is a table illustrating specific storage contents of an error number/threshold occurrence number setting unit of the RAM;

FIG. 8 is a table illustrating specific storage contents of an error number/occurrence number storage unit of the RAM.

FIG. 12 is a table illustrating specific storage contents of an error occurrence hysteresis storage unit of the RAM;

FIG. 13 is a diagram illustrating an example of an error indication that is displayed in the processing procedures of FIG. 11;

FIG. 14 is a table illustrating specific storage contents of an error number/corresponding error group storage unit of the ROM;

FIG. 15 is a table illustrating specific storage contents of an error group number/error group content character string storage unit of the ROM;

FIG. 16 is a table illustrating specific storage contents of an error group number/threshold occurrence number setting unit of the RAM;

FIG. 17 is a table illustrating specific storage contents of an error group number/occurrence number storage unit of the RAM;

DESCRIPTION OF THE PREFERRED EMBODIMENTS

In the following, preferred embodiments of the present invention are described with reference to the accompanying drawings.

Figure 1:
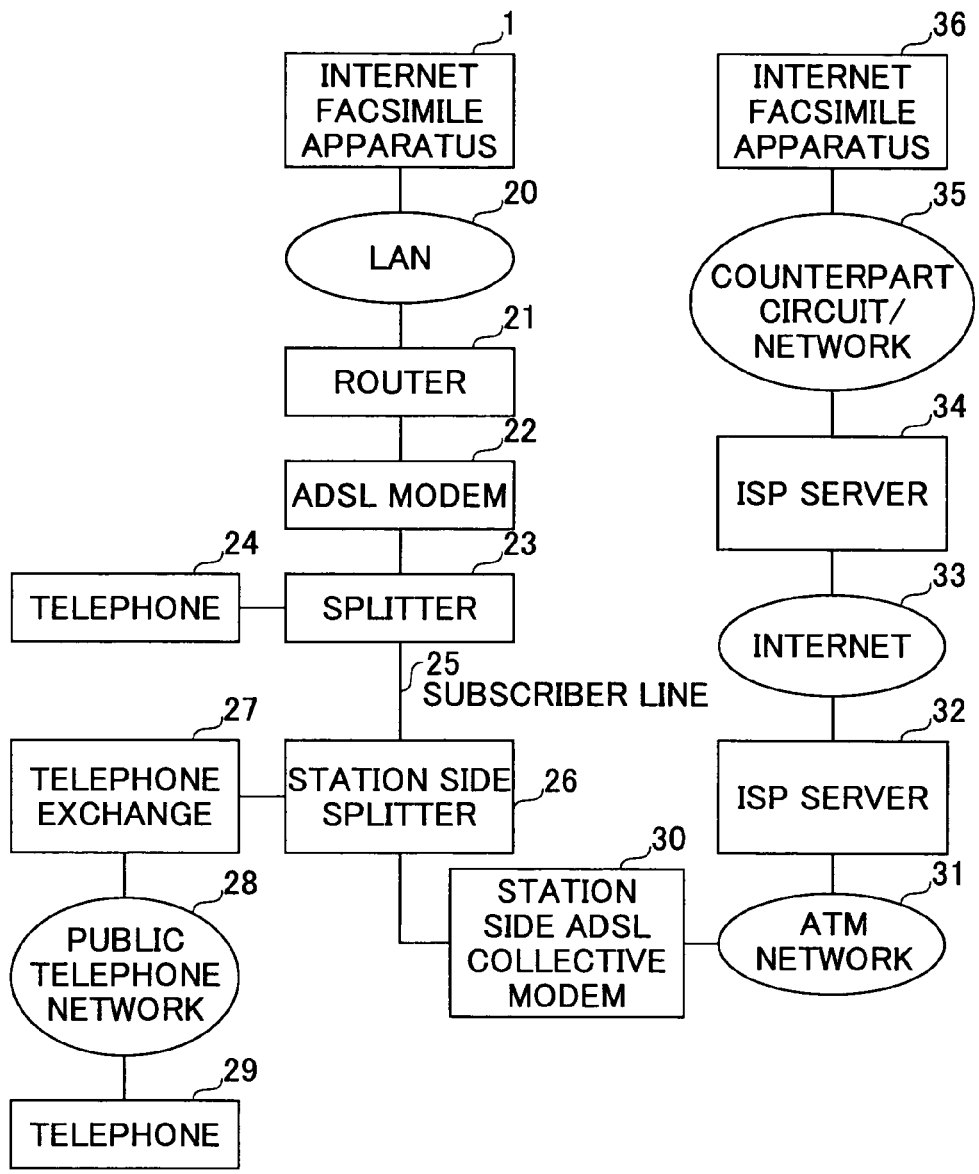
FIG. 1 is a block diagram illustrating a network configuration connecting an Internet facsimile apparatus corresponding to a network communication terminal apparatus according to an embodiment of the present invention.

FIG. 1 is a block diagram illustrating a circuit/network configuration that is implemented between an Internet facsimile apparatus and its counterpart Internet facsimile apparatus as a network communication terminal apparatus according to an embodiment of the present invention.

In FIG. 1, a packet sent from the Internet facsimile apparatus 1 is input to an ADSL modem 22 via a LAN 20 and a router 21 where the packet is divided into ATM cells and then converted into a high frequency electric signal. The high frequency signal, which is exchanged between the ADSL modem 22 and a station side ADSL collective modem 30 via a subscriber line 25, is separated from a low frequency audio signal by a station side splitter 26. This audio signal is exchanged between a telephone 24 and a telephone 29 via a telephone exchange 27 and a public telephone network 28.

The station side ADSL collective modem 30 receives the high frequency signal from the ADSL modem 20 and reconverts the signal back to the ATM cells to send these cells to an ISP (Internet service provider) server 32 via an ATM network 31. The ISP server 32 may function as an SMTP server for the Internet facsimile apparatus 1 to realize mail transmission, and as a POP server, a confirmation server, and other various servers to realize mail reception.

A packet that is to be sent to the Internet facsimile apparatus 1 from the ISP server 32 follows a reverse route of the above-described route.

In this way, the Internet facsimile apparatus 1 may realize mail transmission by SMTP and mail reception by POP via the ISP server 32.

The Internet facsimile apparatus 36 corresponding to the counterpart apparatus may be connected to a counterpart ISP server 34 via a counterpart circuit/network 35 that may be in various formats. In such a setting, the ISP server 32 and the ISP server 34 may be arranged to exchange e-mail via the Internet 33 so that the Internet facsimile apparatus 1 and the Internet facsimile apparatus 36 are able to exchange document data by e-mail. Herein, even when there is no fault in the Internet facsimile apparatuses 1 and 36, the communication between the apparatuses may be disrupted by trouble occurring in the ISP server 32 such as a fault in the POP sever function or the SMTP function of the ISP server 32. However, such faults may oftentimes be set right in a short period of time, unlike trouble occurring in facsimile communications realized via a conventional public telephone line such as a paper-out condition on the counterpart apparatus side or an error occurring during communication, for example.

It is noted that the connection of the Internet facsimile apparatus to a network such as the Internet is not limited to a configuration as described in FIG. 1. For example, the connection to a server may also be realized via a LAN. In other words, the present invention is not limited to a particular network connection mode of the Internet facsimile apparatus 1, and the connection may take any form.

Figure 2:
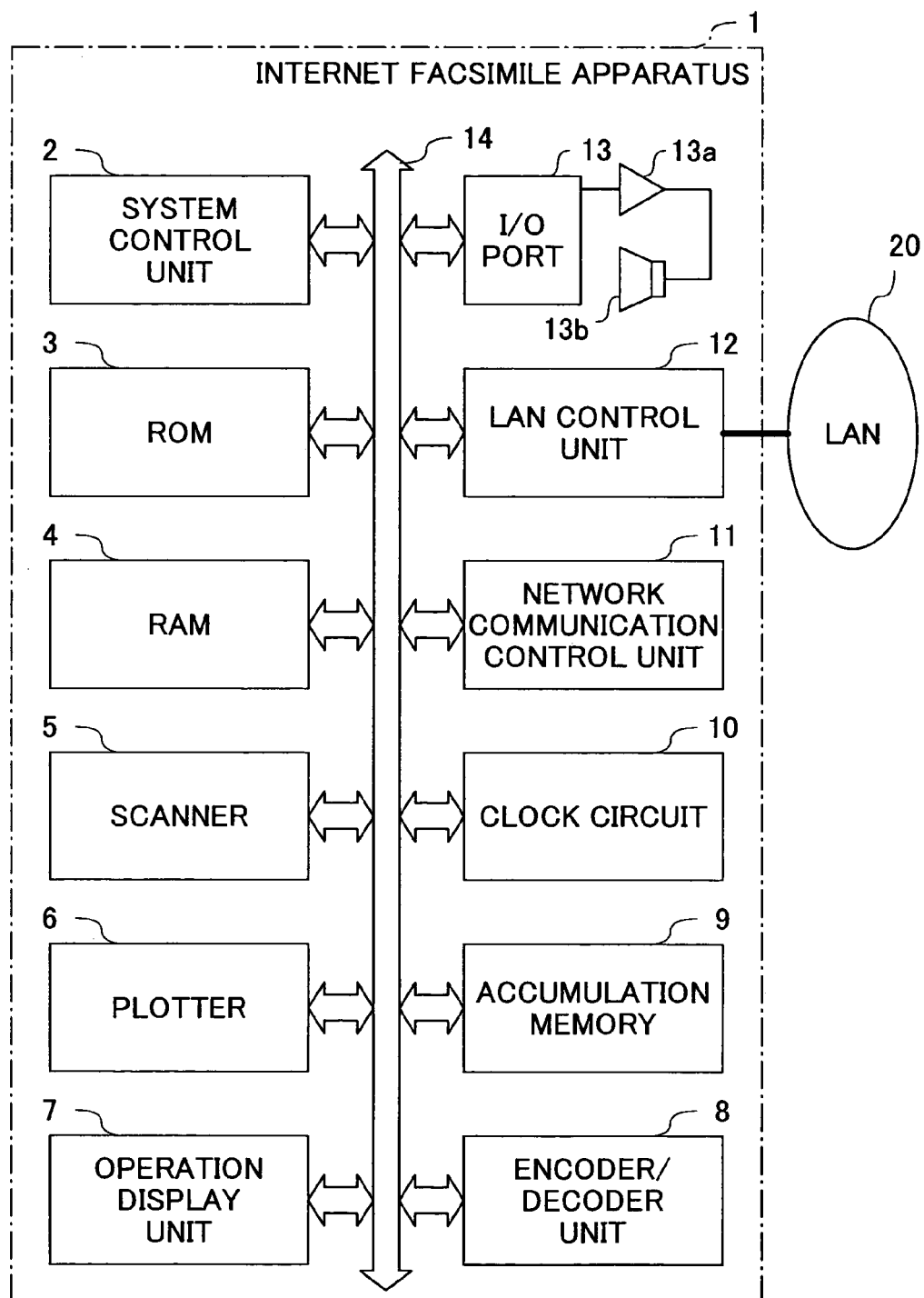
FIG. 2 is a block diagram illustrating a configuration of the Internet facsimile apparatus according to an embodiment of the present invention.

FIG. 2 is a block diagram illustrating a configuration of the Internet facsimile apparatus 1 as a network communication terminal apparatus according to an embodiment of the present invention.

In this drawing, the facsimile apparatus 1 includes a system control unit 2, a ROM 3, a RAM 4, a scanner 5, a plotter 6, an operations display unit 7, an encoder/decoder unit 8, an accumulation memory 9, a clock circuit 10, a network communication control unit 11, a LAN control unit 12, an I/O port 13, a buffer circuit 13a and a speaker 13b that are connected to the I/O port 13, and a system bus 14.

The system control unit 2 corresponds to a microcomputer that controls each unit of the facsimile apparatus 1 according to control programs written in the ROM 3 and using the RAM 4 as a working area. The ROM 3 corresponds to a read-only memory storing the control programs for the system control unit 2 to control the units of the facsimile apparatus 1. The RAM 4 corresponds to a random-access memory that is used as a working area of the system control unit 2.

The scanner 5 reads an original image at a predetermined read line density, for example, at 3.85 lines/mm, 7.7 lines/mm, or 15.4 lines/mm, to obtain image information of the original image. The plotter 6 has functions of outputting/recording received image information according to its predetermined line density, and outputting/recording image information read by the scanner 5 according to its line density, for example (the outputting/recording corresponding to a copying operation).

The operations display unit 7 has various keys for accepting various operation inputs from a user and a display unit such as a liquid crystal display apparatus for displaying various messages to a user such as an operation state of the apparatus of which the user should be notified.

The encoder/decoder unit 8 has functions of compressing transmission image data according to a predetermined format compatible with facsimile such as the MH encoding format, the MR encoding format, and the MMR encoding format, for example, and decompressing received image data according to a decoding format corresponding to the predetermined encoding format such as the MH encoding format, the MR encoding format, and the MMR encoding format.

The accumulation memory 9 corresponds to a large capacity memory for temporarily accumulating document data yet to be transmitted, or received document data yet to be output, for example.

The clock circuit 10 keeps track of the current time and date based on an oscillation frequency of a crystal oscillator. The system control unit 2 may obtain information pertaining to the current time and date by reading a signal from the clock circuit 10 via a system bus 14.

The network communication control unit 11 controls various network protocols such as the TCP/IP protocol on the LAN that is controlled by the LAN control unit 12, the POP protocol for realizing mail reception, and the SMTP protocol for realizing mail transmission, for example.

The LAN control unit 12 corresponds to a physical interface with a LAN 20, and has the function of controlling the LAN protocol.

The I/O port 13 is connected to the speaker 13b via the buffer circuit 13a, and the system control unit 2 controls the operation of the speaker 13b by turning ON/OFF a predetermined port of the I/O port 13.

The system bus 12 corresponds to a signal line for exchanging data between the units of the facsimile apparatus 1.

Figure 3:
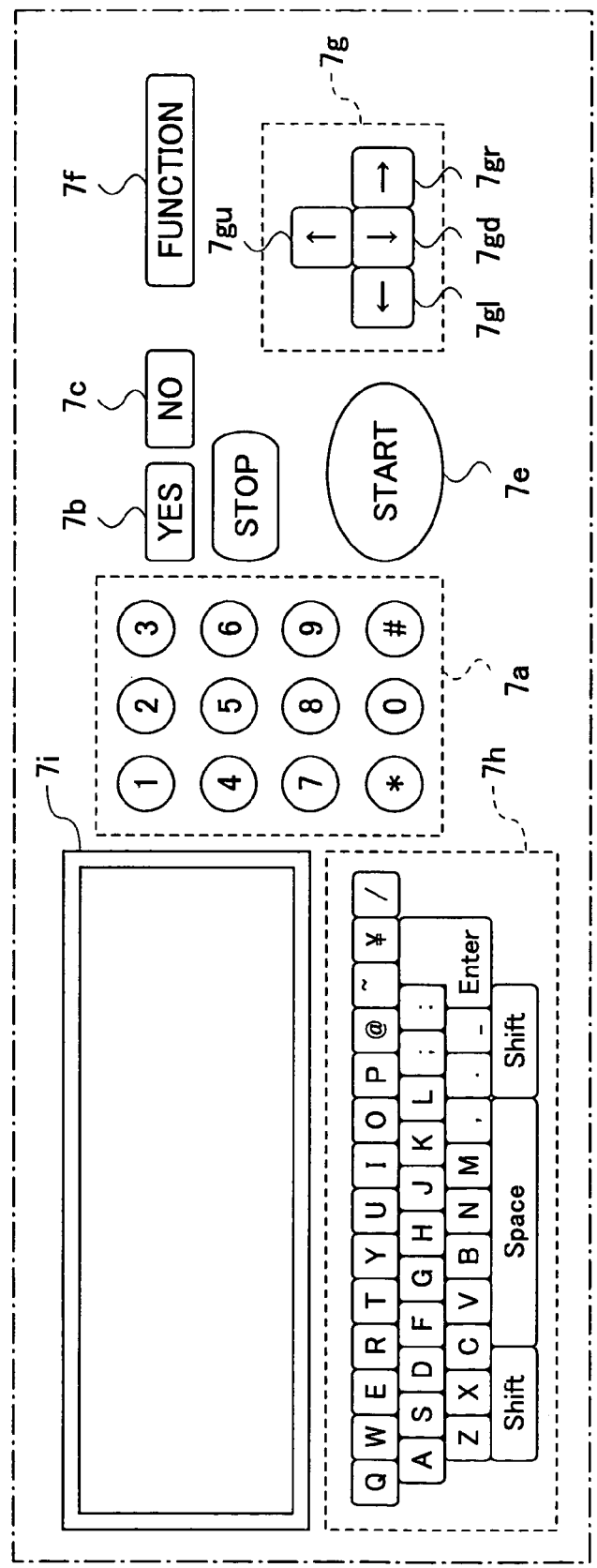
FIG. 3 is a block diagram illustrating a configuration of an operations display unit of the Internet facsimile apparatus.

FIG. 3 is a block diagram illustrating a detailed configuration of the operations display unit 7.

In this drawing, numeral keys 7a are for inputting numbers and symbols such as '#' and '*'. A YES key 7b is for making a positive input with respect to content displayed on a display 7i. A NO key 7c is for making a negative input with respect to content displayed on the display 7i.

A STOP key 7d is for instructing compulsory halting of an operation of the facsimile apparatus 1. A START key 7e is for instructing starting of an operation of the facsimile apparatus 1. A FUNCTION key 7f is for calling an operations menu by pressing this FUNCTION key 7f and making a number input using one or more of the numeral keys 7a.

A group of arrows 7g including '↑' (up) key 7gu, '↓' (down) key 7gd, '→' (right) key 7gr, and '←' (left) key 7gl is for selecting a specific item from selection items displayed on the display 7i, and scrolling the display content of the display 7i up/down/left/right, for example.

A key board unit 7h is for making inputs such as a destination address for an e-mail message.

Figure 4:
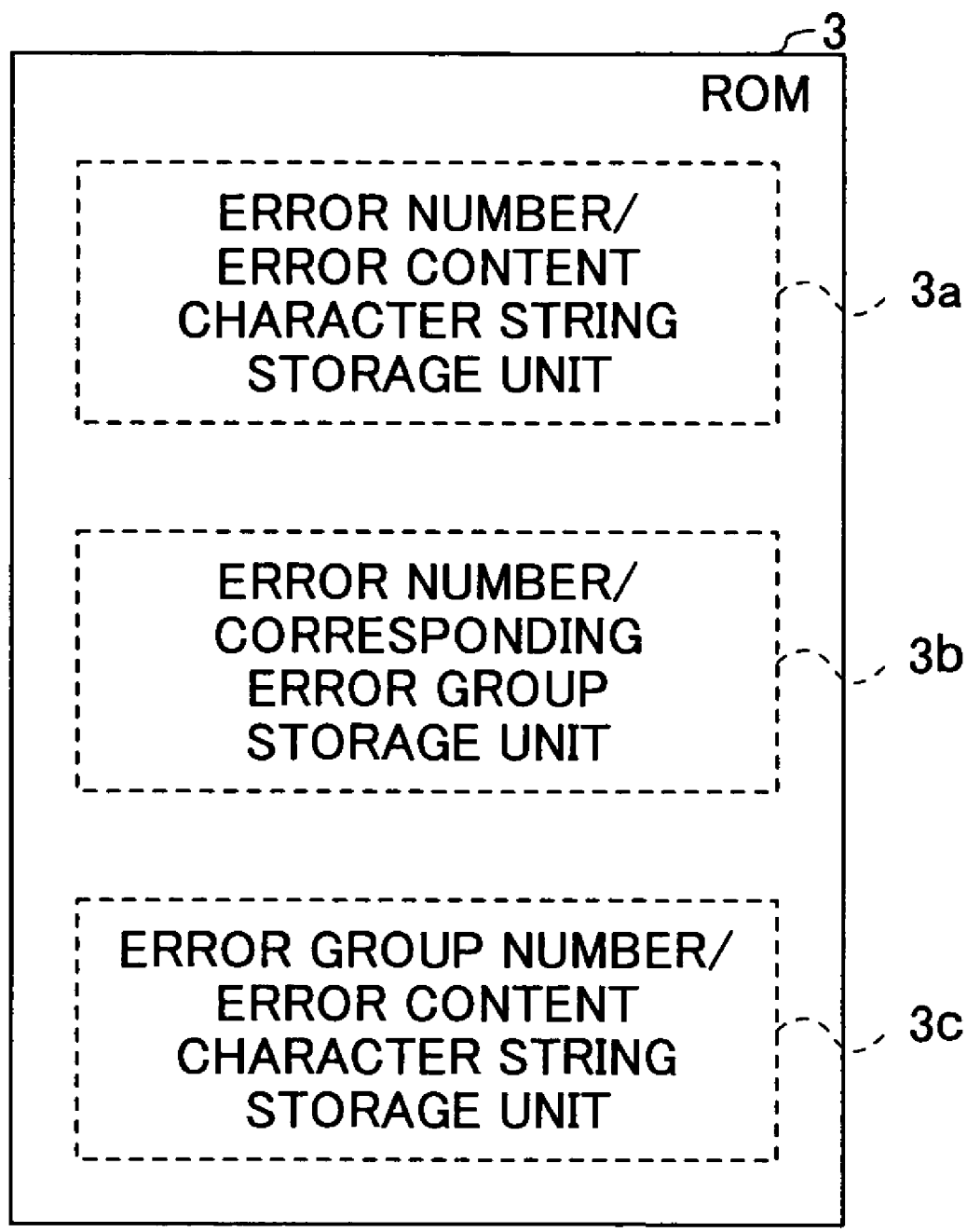
FIG. 4 is a block diagram illustrating storage contents of a ROM of the Internet facsimile apparatus.

FIG. 4 is a block diagram illustrating a configuration of the ROM 3. As is shown in this drawing, the ROM 3 is characterized by including storage areas corresponding to an error number/error content character string storage unit 3a, an error number/corresponding error group storage unit 3b, and an error group number/error content character string storage unit 3c. Details of each of the storage areas are described below in conjunction with descriptions of specific embodiments of the present invention.

Figure 5:
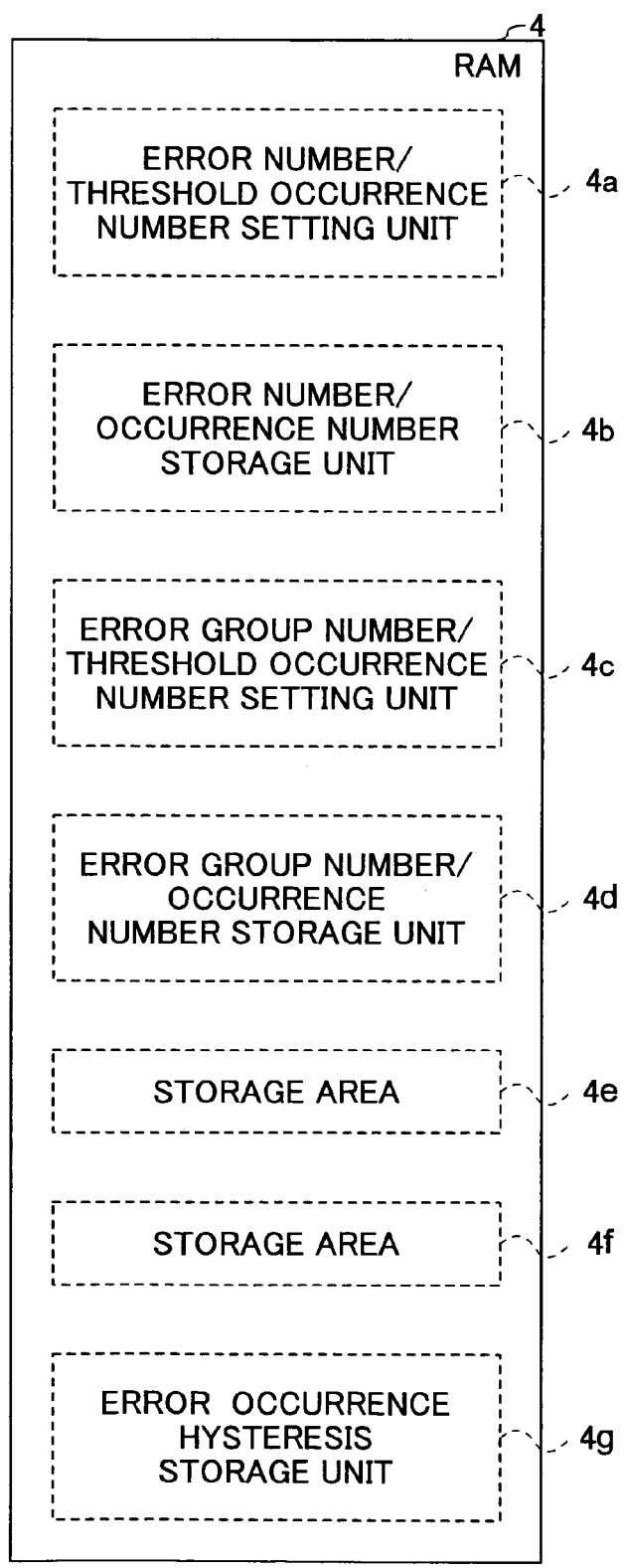
FIG. 5 is a block diagram illustrating storage contents of a RAM of the Internet facsimile apparatus.

FIG. 5 is a block diagram illustrating a configuration of the RAM 4. As is shown in this drawing, the RAM 4 of the present embodiment is characterized by including storage areas corresponding to an error number/threshold occurrence number setting unit 4a, an error number/occurrence number storage unit 4b, an error group number/threshold occurrence number setting unit 4c, an error group number/ occurrence number storage unit 4*d*, a storage area 4*e*, a storage area 4*f*, and an error occurrence hysteresis storage unit 4*g*. Details of each of these storage areas are described below in conjunction with specific embodiments of the present invention.

In the following, processing procedures of the Internet facsimile apparatus 1 according to a first embodiment of the present invention are described.

FIG. 6 is a table illustrating specific storage contents of the error number/error content character string storage unit 3*a* that is referred to in the processing procedures according to the first embodiment.

In the storage unit 3*a* as represented by FIG. 6, error numbers for identifying various types of errors relating to the network communication operation are associated with corresponding character strings for indicating their respective error contents.

For example, error number 01 indicates that a predetermined response for a request to a DNS (domain name system) server cannot be found, and an IP address corresponding to a host name being inquired into cannot be obtained so that connection to a server for mail transmission/reception cannot be established, thus ending in an error of the communication operation.

Error number 02 corresponds to an error due to an inability to obtain a predetermined response from a POP server upon accessing the POP server using the POP protocol (POP server cannot be found).

Error number 03 corresponds to an error due to an inability to obtain a predetermined response from an SMTP server upon accessing the SMTP server using the SMTP protocol (SMTP server cannot be found).

Error number 04 corresponds to an error occurring when login access is rejected in a confirmation procedure with the POP server (Cannot login to POP server).

Error number 05 corresponds to an error occurring when a line is disconnected during connection with the POP sever (Line disconnected during connection with POP server).

Error number 06 corresponds to an error occurring in a case where a response is received from the SMTP server with respect to an access made to the SMTP sever according to the SMTP protocol but a service cannot be provided due to a busy state of the SMTP server (SMTP server is busy).

Error number 07 corresponds to an error occurring when a line is disconnected during connection with the SMTP server (Line disconnected during connection with SMTP server).

FIG. 7 is a table illustrating specific storage contents of the error number/threshold occurrence number setting unit 4*a* that is referred to in the processing procedures according to the first embodiment.

In the setting unit 4*a* as represented by FIG. 7, error numbers corresponding to various types of errors relating to the network communication operations are associated with their respective threshold occurrence numbers.

The threshold occurrence number for each of the error numbers may be set in the setting unit 4*a* through an error number/threshold occurrence number setting procedure that may be started by pressing the FUNCTION key 7*f* and inputting a number '10' using the numeral keys 7*a*, for example, in which procedure the error numbers are associated with their corresponding threshold occurrence numbers through an interactive input process using the display 7*i*. Alternatively, a remote setting scheme via a network may be implemented.

FIG. 8 is a table illustrating specific storage contents of the error number/occurrence number storage unit 4*b* that is referred to in the processing procedures according to the first embodiment.

In the storage unit 4*b* as represented by FIG. 8, error numbers corresponding to various types of errors relating to the network communication operation are associated with their respective successive occurrence numbers.

Figure 9:
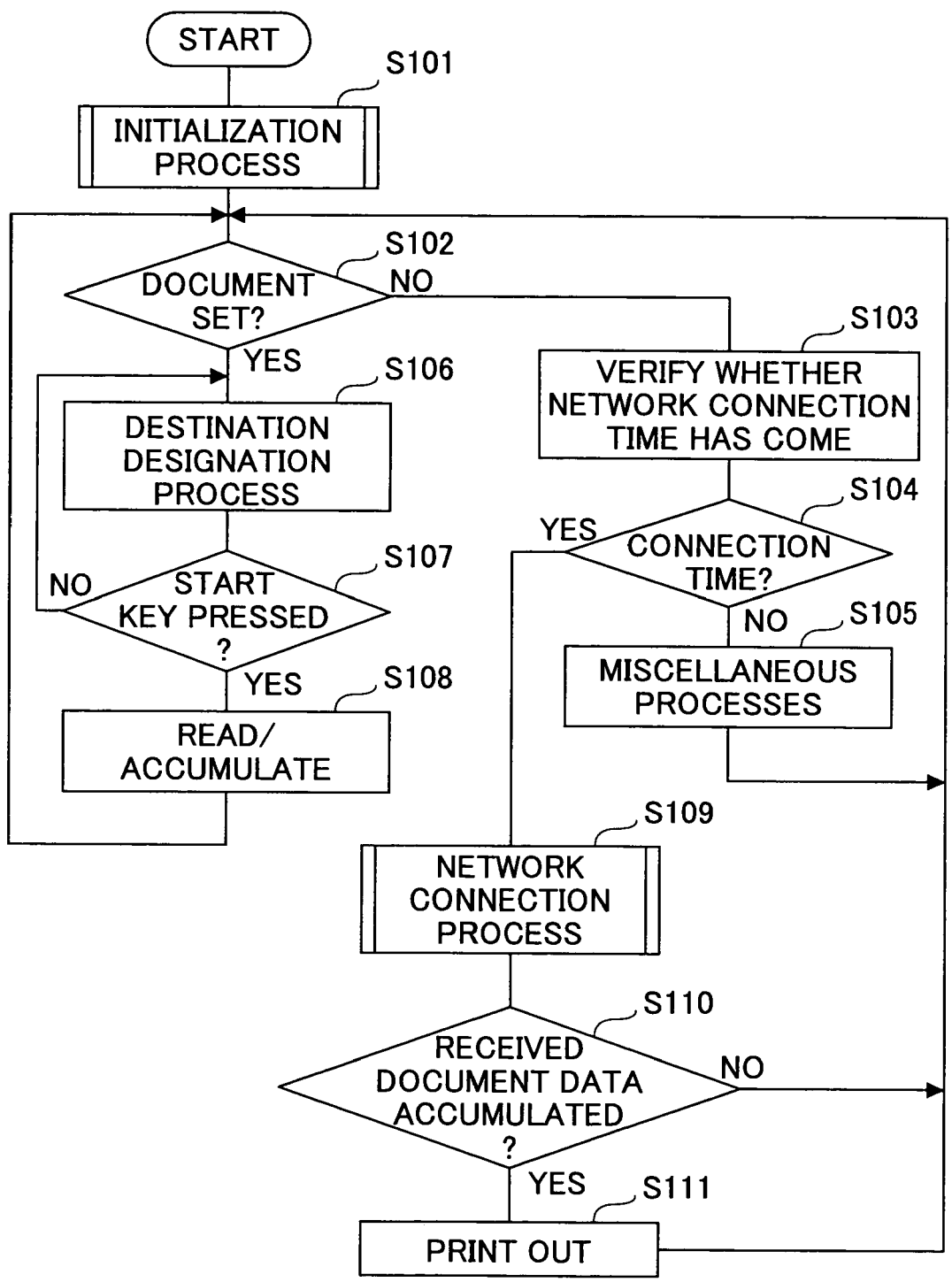
FIG. 9 is a flowchart illustrating common processing procedures for first, second, third, and fourth embodiments of the present invention.

FIG. 9 is a flowchart illustrating the processing procedures according to the first embodiment.

As is shown in this flowchart, first, when a power source is switched on or reset, the system control unit 2 of the Internet facsimile apparatus 1 may perform operation confirmation processes on its units, and initialization processes on variables stored in the RAM 4, for example (process S101).

Then, a determination is made as to whether a document is set to the scanner 5 (determination S102). If it is determined that a document is not set (determination S102 NO), the clock circuit 10 is read to check whether a network connection time, that is, a predetermined connection interval (e.g., 15-minute-interval) has been reached. If the connection time has not been reached (determination S104 NO), other processes such as monitoring the states of the units of the apparatus (process S105) are performed after which the operation goes back to determination S102.

In the determination step S102, if a document is set (determination S102 YES), a message calling for an input of a destination address of an e-mail message is displayed on the display 7*i* of the operations display unit 7, and destination designation processes are successively performed (process S106) for storing character strings that are successively input as destination e-mail addresses (loop established by determination S107 NO) until the START key 7*e* is pressed instructing the start of a read operation. When the START key is pressed (determination S107 YES), image information of the document set to the scanner 5 in the determination step S102 is read by the scanner 5, and the read information is stored/accumulated in the accumulation memory 9 in association with the e-mail address input in the process step S106 (process S108), and the operation goes back to the standby process loop including the determination step S102 NO, the process step S103, the determination step S104 NO, and miscellaneous processes of step S105.

If it is determined in the determination step S104 that the connection time has come (determination S104 YES), a network connection process is realized by the network communication control unit 11 using the SMTP protocol and the POP protocol over the TCP/IP protocol (process S109). If received document data are accumulated in the accumulation memory 9 as a result of the network connection process (determination S110 YES), the accumulated document data are output and printed by the plotter 6, after which the operation goes back to the standby process loop.

If no received document data are accumulated (determination S110 NO), the operation goes directly back to the standby process loop.

Figure 10:
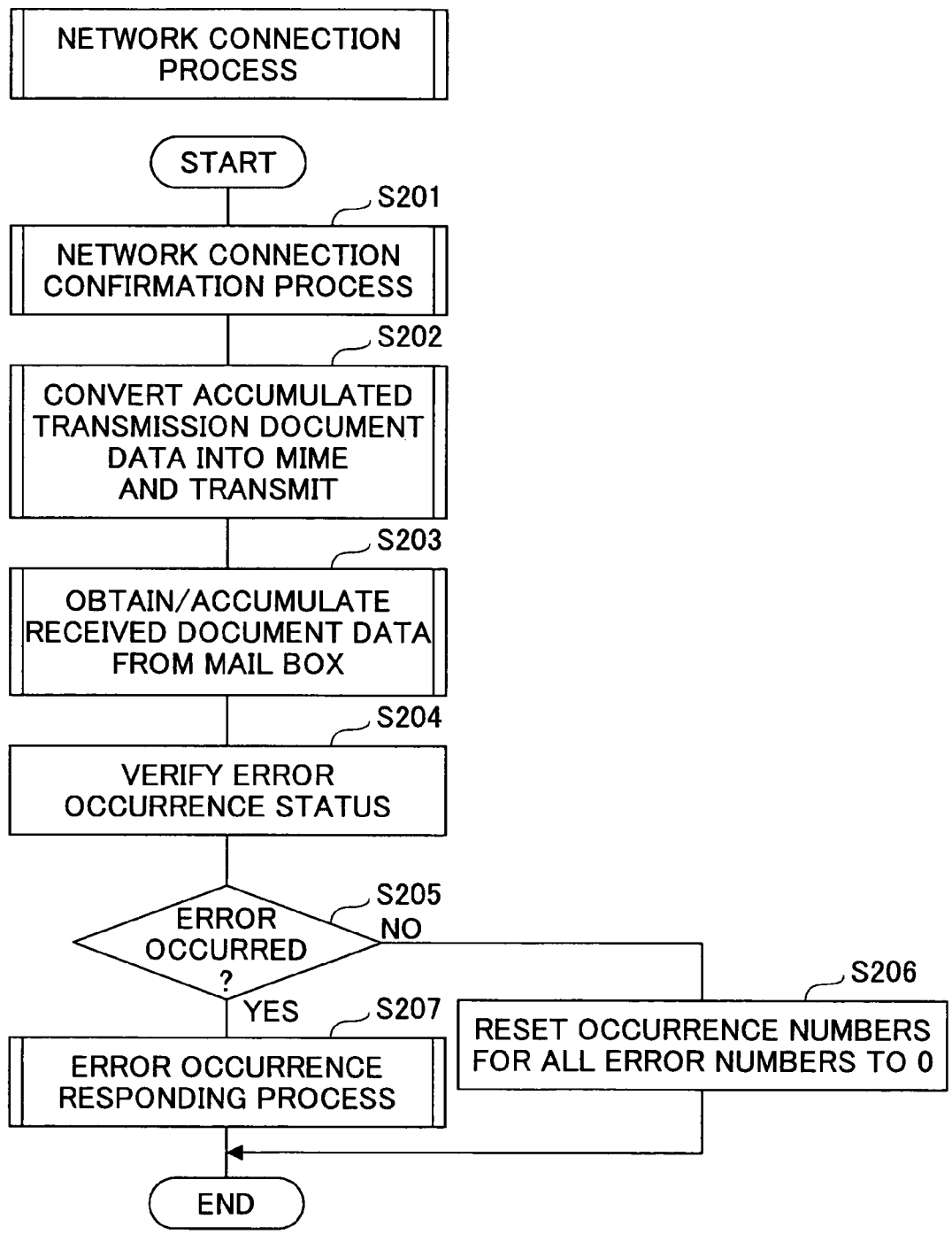
FIG. 10 is a flowchart illustrating specific processing procedures for realizing a network connection process according to the first embodiment.

FIG. 10 is a flowchart illustrating an example of specific processing procedures for realizing the network connection process corresponding to process step S109 of FIG. 9.

In the network connection process shown in this flowchart, first a network connection confirmation process is performed between the POP server and the SMTP server (process S201), after which the transmission document data accumulated in the process step S108 of FIG. 9 are converted into MIME format and transmitted to the destination designated in the process step S106 (process S202), while received document data stored in the mail box of the present facsimile apparatus 1 that is provided in the POP server are obtained and accumulated in the accumulation memory 9 (process S203). The received document data accumulated in the process step S203 are output and printed in the process step S111 of FIG. 9.

Then, an inquiry is made into an error occurrence status detected by the network communication control unit 11, for example, in the sequence of network communication operations including the process steps S201, S202, and S203, that is, a verification is made regarding errors corresponding to each of the error numbers (process S204).

If it is determined from the process step S204 that no error has occurred (determination S205 NO), a process of resetting the occurrence numbers respectively corresponding to the error numbers to 0 (zero) is performed in the storage unit 4b (process S206).

If it is determined that an error has occurred (determination S205 YES), an error occurrence responding process is performed on the error number of the detected error and its corresponding error type (process S207).

In the process step S207, the successive occurrence numbers for the types of errors that have not occurred in the present network communication are reset to 0 (zero) without user notification.

Figure 11:
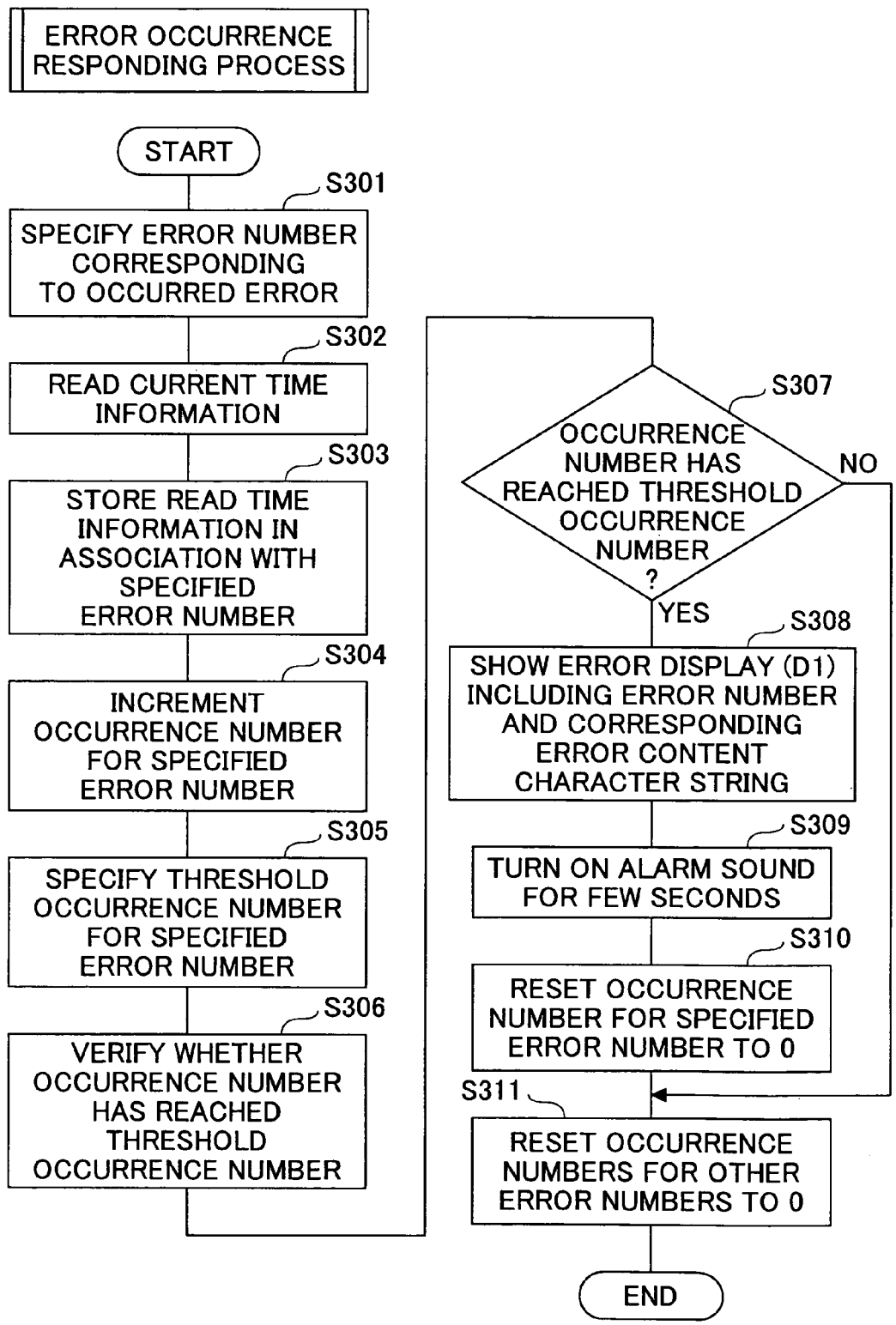
FIG. 11 is a flowchart illustrating specific processing procedures for realizing an error occurrence responding process according to the first embodiment.

FIG. 11 is a flowchart illustrating an example of specific processing procedures for realizing the error occurrence responding process corresponding to the process step S207 of FIG. 10.

In this flowchart, first, an error number corresponding to the type of error that has occurred is specified (process S301), and the current time and date information is read from the clock circuit 10 (process S302). Then, the current time and date information is stored in the error occurrence hysteresis storage unit 4g in association with the specified error number (process S303).

FIG. 12 is a table illustrating storage contents of the storage unit 4g in which error occurrence hysteresis data are accumulated each time the process step S303 of FIG. 11 is performed in the error occurrence responding process.

As is illustrated in this table, in the storage unit 4g, the error occurrence time and the error number corresponding to an error that has occurred are accumulated for each error occurrence. Thus, by referring to the storage unit 4g and the error number/error content character string storage unit 3a, an error hysteresis report may be easily created and output.

For example, the error hysteresis report may be called for by pressing the FUNCTION key 7f and inputting the number '20' using the numeral keys 7a, and the error hysteresis report may be displayed on the display 7i, printed out by the plotter 6, and/or transmitted to a predetermined mail address, for example. The error hysteresis report may be provided to the user as reference information for setting in the setting unit 4a the threshold occurrence numbers for the respective types of errors. In such case, by storing the time and date information of the error occurrences, a more suitable value may be selected and set as the threshold value so that error notification is not made unless it is necessary or desired.

Referring back to FIG. 11, after the process step S303, the occurrence number corresponding to the error number specified in the process step S301 is incremented by +1 (process S304). Then, the corresponding threshold occurrence number for the specified error number is specified by referring to the setting unit 4a (process S305).

Then, a verification is made regarding incremented occurrence number obtained in the process step S304 having reached the specified threshold occurrence number obtained in the process step S305 (process S306).

If it is determined that the incremented number has not yet reached the specified threshold occurrence number (determination S307 NO), the corresponding occurrence numbers for the error numbers other than the specified error number are reset to 0 (process S311), and the error occurrence responding process is ended. It is noted that by performing the process step S311, the error number corresponding to the present error occurrence is monitored for a successive error occurrence.

If it is determined that the incremented number has reached the specified threshold occurrence number (determination S307 YES), the error number specified in the process step S301, and the error content character string in the storage unit 3a corresponding to the specified number are output together as an error indication such as a display D1 shown in FIG. 13.

In the display D1 of FIG. 13, a message indicating that a network communication error has occurred, an error number (04), and an error content corresponding to the error number (cannot login to POP server) are displayed.

The user may know that an error has occurred in the network communication upon seeing this display. In such case, the error that is being displayed has actually occurred successively for a number of times corresponding to the threshold occurrence number set in the setting unit 4a (in the case of the error number 04, the occurrence number is 4 times according to FIG. 7).

In this way, the present embodiment has been conceived in consideration of the fact that many errors occurring in network communications are easily restored in a short period of time. Taking this into consideration, a user is not notified each time an error occurs, and instead the user is notified when an error occurs successively so that the user is not distracted by frequent notification of irrelevant errors.

It is noted that the display D1 is displayed until the YES key 7b is pressed corresponding to an input representing recognition on the user side. Also, in process step S309, an alarm sound is turned on for a few seconds at the speaker 13b. In this way, the user may be able to recognize a substantial error that is successively occurring.

Then, the occurrence number stored in the setting unit 4b corresponding to the error number that is specified in the process step S301 is reset to 0 (process S310). In this way, the error indication D1 that is displayed in the process step S308 is prevented from being displayed again in a short period of time to distract the user. Then, the process step S311 as described above is performed after which the error occurrence responding process is ended.

In the following, processing procedures performed in the Internet facsimile apparatus 1 according to a second embodiment of the present invention are described.

FIG. 14 is a table illustrating specific storage contents of the error number/corresponding error group storage unit 3b that is referred to in the processing procedures according to the second embodiment.

As is shown in this table, the storage unit 3b stores error numbers that are respectively associated with their corresponding error group numbers (error groups represented by the error group numbers).

In the present embodiment, error group number 01 represents errors related to mail reception (POP), and error group number 02 represents errors related to mail transmission (SMTP). Also, error group number 00 is provided as a special error group indicating that the error numbers of errors being assigned this error group number 00 do not belong to any other error group and are therefore to be handled as independent errors.

In the present embodiment, the error number 01 corresponding to the error 'DNS server cannot be found' is handled as an independent error. For the error corresponding to the error number 01, the error occurrence responding process according to the first embodiment is applied.

FIG. 15 is a table illustrating specific storage contents of the error group number/error group content character string storage unit 3c that is referred to in the processing procedures according to the second embodiment.

As is shown in this table, the storage unit 3c associates error group numbers respectively corresponding to groups of errors relating to network communication operations with their corresponding error group contents that characterize the respective error groups.

FIG. 16 is a table illustrating specific storage contents of the error group number/threshold occurrence number setting unit 4c that is referred to in the processing procedures according to the second embodiment.

As is shown in this table, the setting unit 4c associates error group numbers corresponding to respective groups of errors relating to network communication operations with their corresponding threshold occurrence numbers.

The threshold occurrence number for each of the error group numbers may be set in the setting unit 4a through an error group number/threshold occurrence number setting procedure that may be started by pressing the FUNCTION key 7f and inputting a number '30' using the numeral keys 7a, for example, in which procedure the error group numbers are associated with their corresponding threshold occurrence numbers through an interactive input process using the display 7i. Alternatively, a remote setting scheme via a network may be implemented.

FIG. 17 is a table illustrating specific storage contents of the error group number/occurrence number storage unit 4d that is referred to in the processing procedures according to the second embodiment.

In the storage unit 4d as represented by FIG. 17, error group numbers corresponding to groups of errors relating to the network communication operations are associated with their corresponding successive occurrence numbers.

It is noted that the processing procedures according to the second embodiment follows the same procedures as those shown in FIG. 9 describing the first embodiment. However, in the present embodiment, processing procedures for realizing a network connection process as illustrated in FIG. 18 and an error occurrence responding process as illustrated in FIG. 19 are performed instead of the processing procedures of FIGS. 10 and 11 of the first embodiment.

Figure 18:
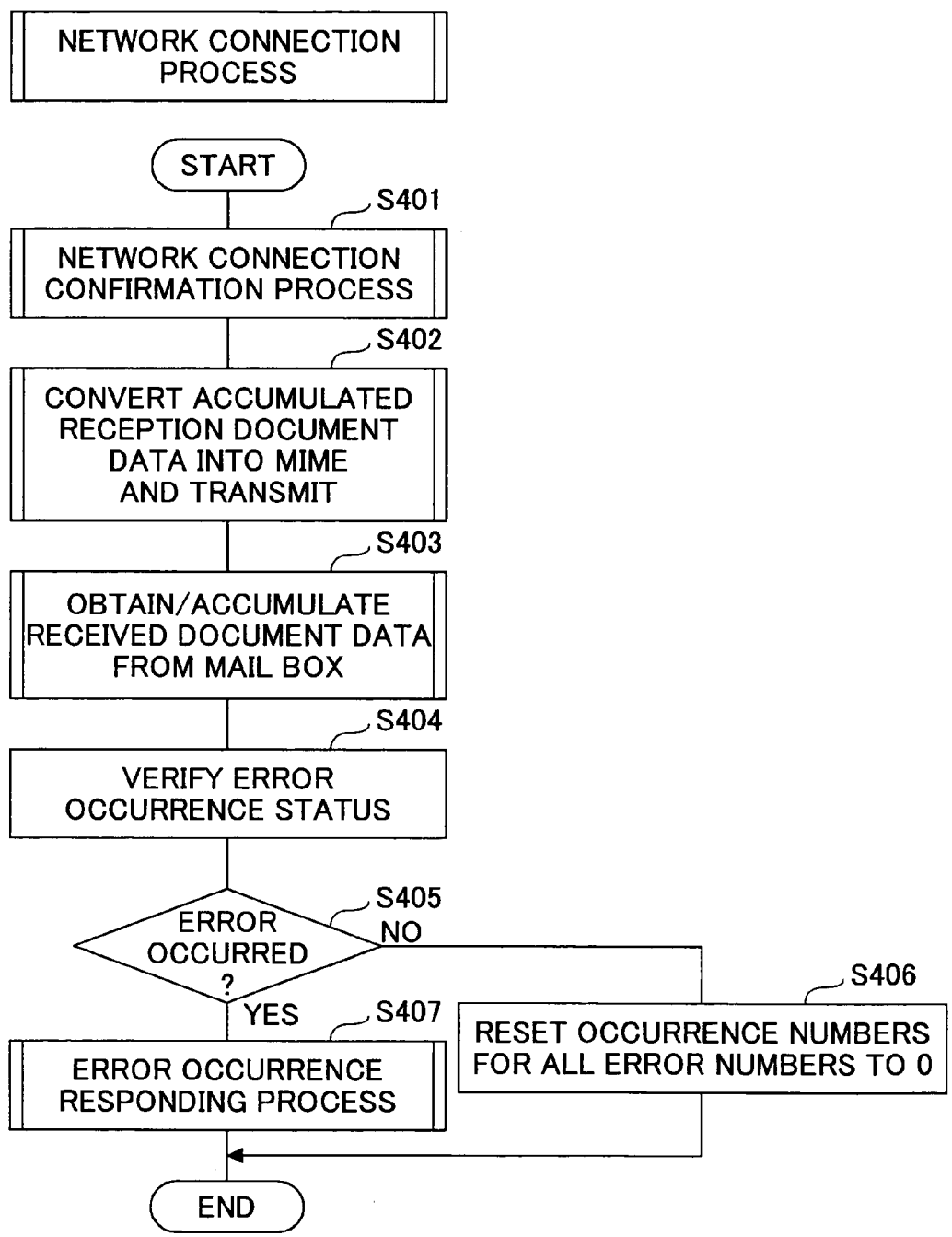
FIG. 18 is a flowchart illustrating specific processing procedures for realizing a network connection process according to the second embodiment.
Figure 19:
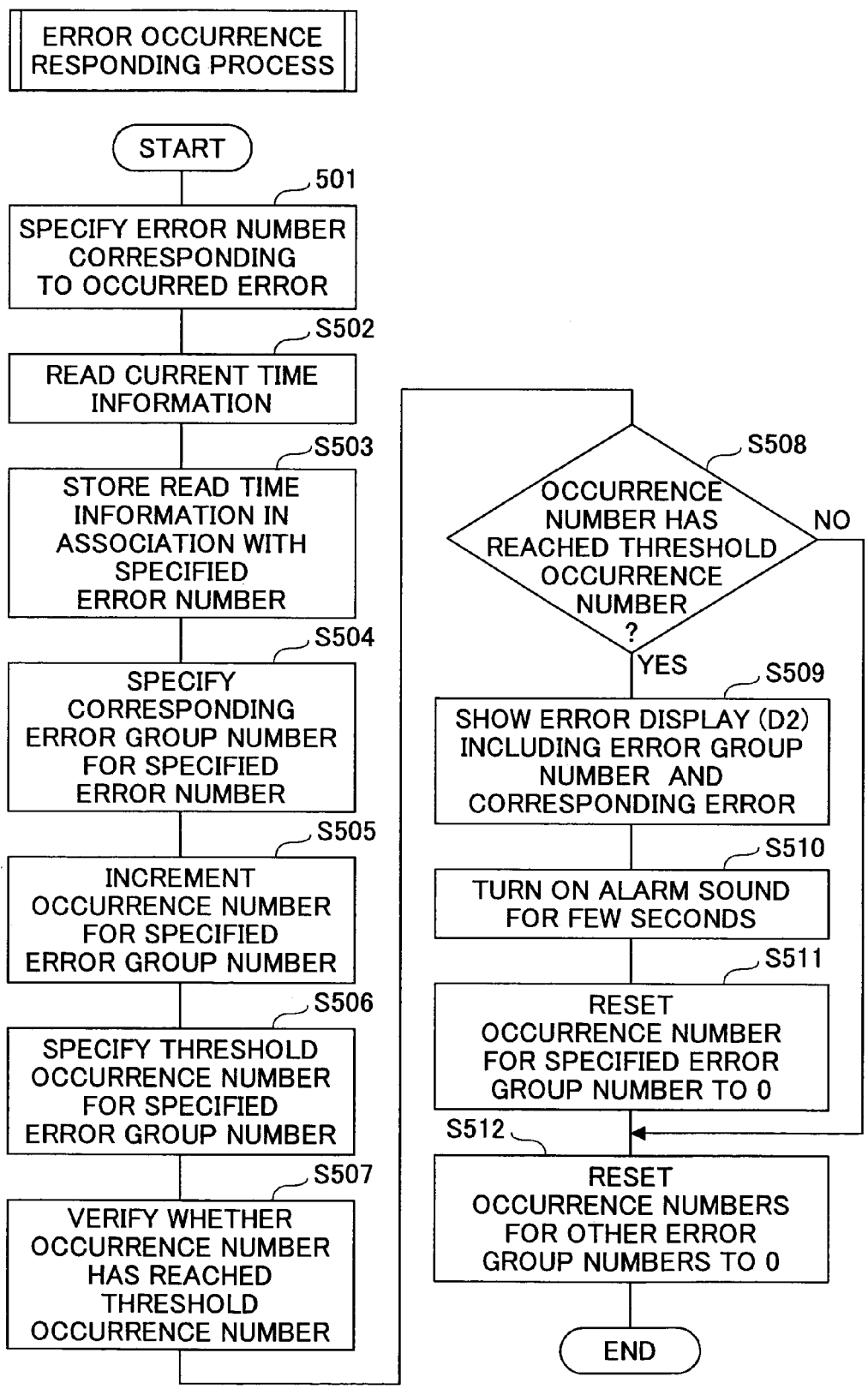
FIG. 19 is a flowchart illustrating specific processing procedures for realizing an error occurrence responding process according to the second embodiment.

FIG. 18 is a flowchart illustrating another example of specific processing procedures for realizing the network connection process corresponding to the process step S109 of FIG. 9.

In the network connection process of FIG. 18, first, network connection confirmation processes are performed between the POP server and the SMTP server (process S401), after which the transmission document data accumulated in the process step S108 of FIG. 9 are converted into MIME format and transmitted to the destination designated in the process step S106 (process S402), while received document data stored in the mail box for the present facsimile apparatus 1 that is provided in the POP server are obtained and accumulated in the accumulation memory 9 (process S403). The received document data accumulated in the process step S403 are output and printed in the process step S111 of FIG. 9.

Then, an inquiry is made into an error occurrence status detected by the network communication control unit 11, for example, in the sequence of network communication operations including the process steps S401, S402, and S403, that is, a verification is made concerning an error corresponding to each of the error numbers (process S404).

If it is determined from the process step S404 that no error has occurred (determination S405 NO), a process of resetting the occurrence numbers corresponding to the error group numbers to 0 (zero) is performed in the storage unit 4d (process S406).

If it is determined that an error has occurred (determination S405 YES), an error occurrence responding process is performed on the error number (error type) corresponding to the error occurrence (process S407).

In the process step S407, the successive occurrence numbers for the error groups that do not correspond to the error that has occurred in the present network communication are reset to 0 (zero) and there is no user notification.

FIG. 19 is a flowchart illustrating an example of specific processing procedures for realizing the error occurrence responding process corresponding to the process step S407 of FIG. 18.

In the error occurrence responding process of FIG. 19, first, an error number corresponding to the type of error that has occurred is specified (process S501), and the current time and date information is read from the clock circuit 10 (process S502). Then, the current time and date information is associated with the specified error number (error type) and stored in the error occurrence hysteresis storage unit 4g shown in FIG. 12 (process S503).

As is illustrated in FIG. 12, since the error number together with the error occurrence time of an error occurrence are accumulated in the error occurrence hysteresis storage unit 4g, an error hysteresis report may be easily created and output by referring to the error occurrence hysteresis storage unit 4g and the error number/error content character string storage unit 3a.

After the process step S503, the corresponding error group number for the error number specified in the process step S501 is specified by referring to the storage unit 3b (process S504), and the corresponding occurrence number for the specified error group that is stored in the storage unit 4d is incremented by +1 (process S505). Then, the threshold occurrence number corresponding to the specified error group number is specified by referring to the setting unit 4c (process S506).

Then, a process regarding verification of the incremented occurrence number obtained in the process step S505 having reached the threshold occurrence number specified in the process step S506 is carried out (process S507).

If it is determined that the incremented occurrence number has not yet reached the specified threshold occurrence number (determination S508 NO), the occurrence numbers for the error group numbers other than the specified error group number are reset to 0 (process S512), and the present error occurrence responding process is ended. It is noted that by performing the process step S512, the error group number corresponding to the present error occurrence is monitored for a successive error occurrence.

Figure 20:
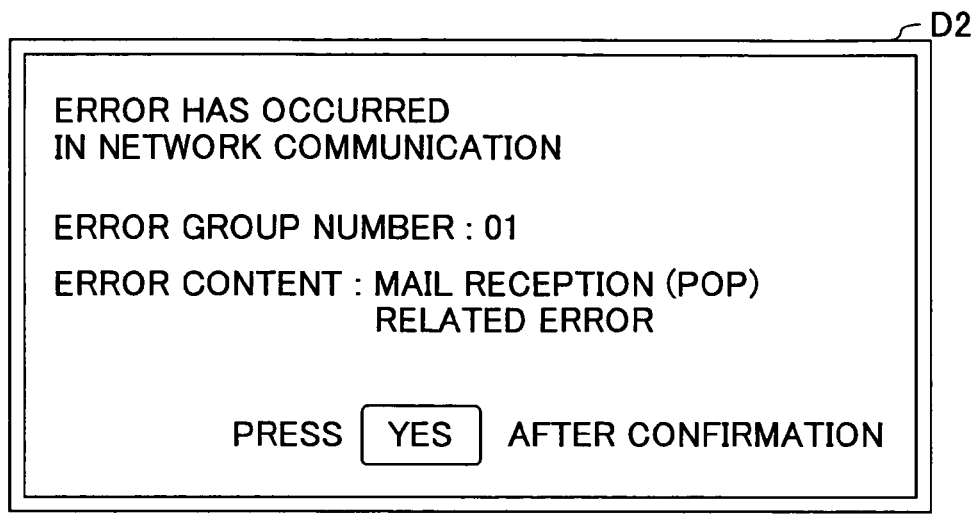
FIG. 20 is a diagram illustrating an example of an error indication that is displayed in the processing procedures of FIG. 19.

If it is determined that the incremented occurrence number has reached the specified threshold occurrence number (determination S508 YES), the error group number specified in the process step S504, and the error group content character string in the storage unit 3a corresponding to the specified error group number are output together as an error indication such as a display D2 shown in FIG. 20.

In the display D2 of FIG. 20, a message indicating that a network communication error has occurred, an error group number (01), and an error content corresponding to the error group number (mail reception (POP) related error) are displayed.

The user may know that an error has occurred in the network communication upon seeing this display. In such case, the error that is being displayed has actually occurred successively for a number of times corresponding to the threshold occurrence number set in the setting unit 4c (in the case of the error group number 01, the occurrence number is 3 times according to FIG. 16).

In this way, the present embodiment has been conceived in consideration of the fact that many errors occurring in network communications are easily restored in a short period of time. Taking this into consideration, a user is not notified each time an error occurs, and instead the user is notified when an error occurs successively so that the user is not distracted by frequent notification of irrelevant errors. Also, by categorically grouping the errors, different settings according to various environmental conditions may be easily realized.

It is noted that the display D2 is displayed until the YES key 7b is pressed corresponding to an input representing recognition of the error occurrence on the user side. Also, in process step S510, an alarm sound is turned on for a few seconds at the speaker 13b. In this way, the user may be able to recognize a substantial error that is successively occurring.

Then, the occurrence number stored in the setting unit 4d corresponding to the error group number that is specified in the process step S504 is reset to 0 (process S511). In this way, the error indication D2 that is displayed in the process step S509 is prevented from being displayed again in a short period of time to distract the user.

Then, the process step S512 of resetting the occurrence numbers corresponding to the other error group numbers are reset to 0 is performed as described above, after which the error occurrence responding process is ended.

In the following, processing procedures performed by the facsimile apparatus 1 according to a third embodiment of the present invention are described.

Figure 21:
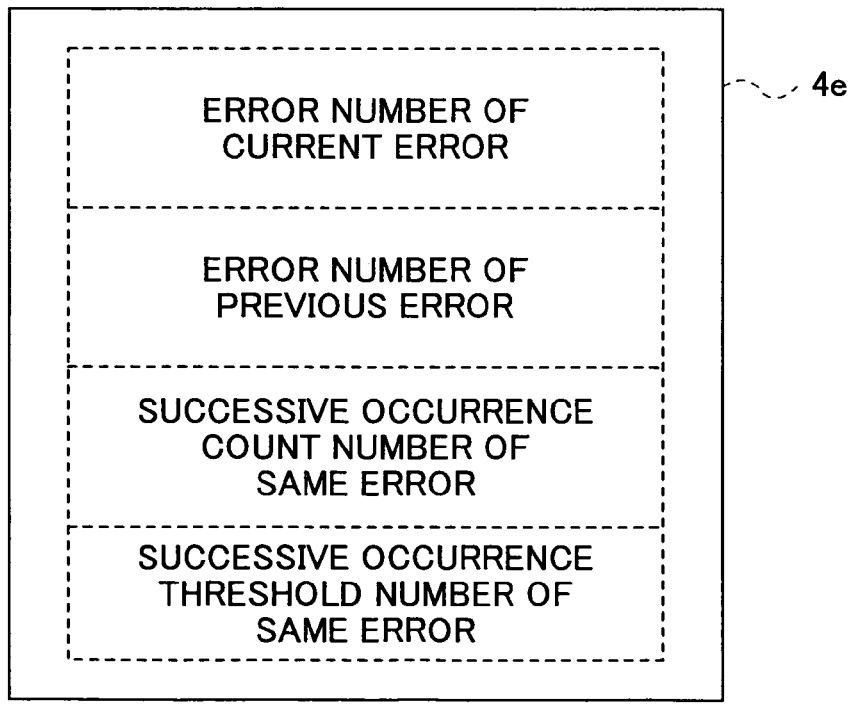
FIG. 21 is a diagram illustrating specific storage contents of a storage area of the RAM.

FIG. 21 is a diagram illustrating an example of specific storage contents of the storage area 4e that is referred to in the processing procedures of the third embodiment.

As is shown in the drawing, the storage area 4e includes variables 'E_current', 'E_previous', 'N_error_new', and 'N_set_new'. 'E_current' corresponds to a variable that represents an error number of a current error, 'E_previous' corresponds to a variable representing an error number of a previous error, 'N_error_new' corresponds to a counter variable representing a successive occurrence number of the same error, and 'N_set_new' corresponds to a variable representing a successive occurrence threshold number of the same error.

The variables 'E_previous' and 'N_error_new' are respectively reset to 0 by the initialization process performed in the process step S101 of FIG. 9. An error number 0 is set for the variable 'E_previous', this error number corresponding to a dummy error number that does not coincide with an actual error number.

The variable 'N_set_new' representing the successive occurrence threshold number of the same error may be set through a successive error occurrence threshold number setting procedure that is started by pressing the FUNCTION key 7f and inputting a number '40', for example, using the numeral keys 7a in which procedure a threshold number is set through an interactive input process using the display 7i. Alternatively, a remote setting scheme realized via a network may be used.

It is noted that the processing procedures according to the third embodiment follows the same procedures as those shown in FIG. 9 describing the first embodiment. However, in the present embodiment, processing procedures for realizing a network connection process as illustrated in FIG. 22 and an error occurrence responding process as illustrated in FIG. 23 are performed instead of the processing procedures of FIGS. 10 and 11 of the first embodiment.

Figure 22:
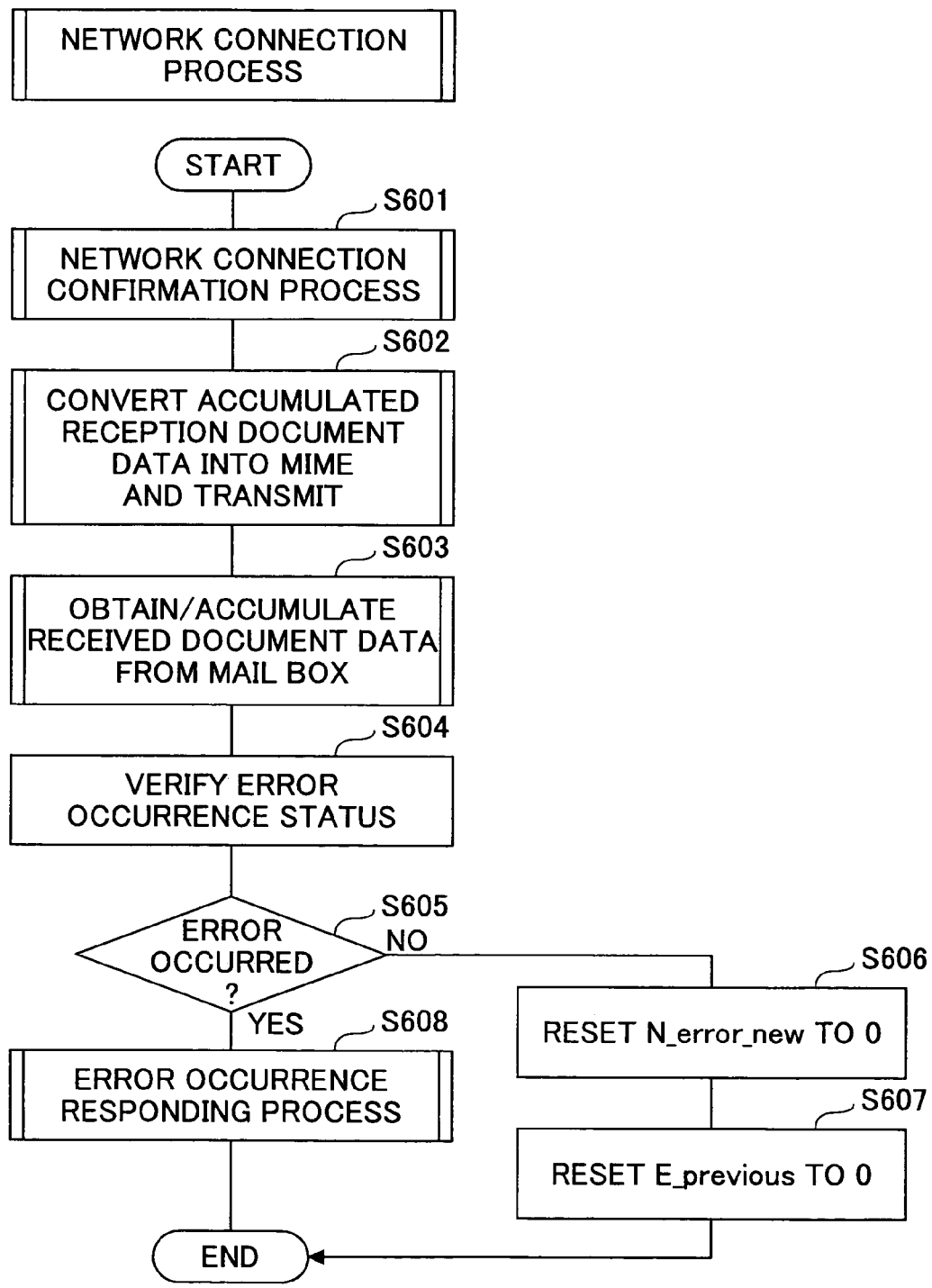
FIG. 22 is a flowchart illustrating specific processing procedures for realizing a network connection process according to the third embodiment.
Figure 23:
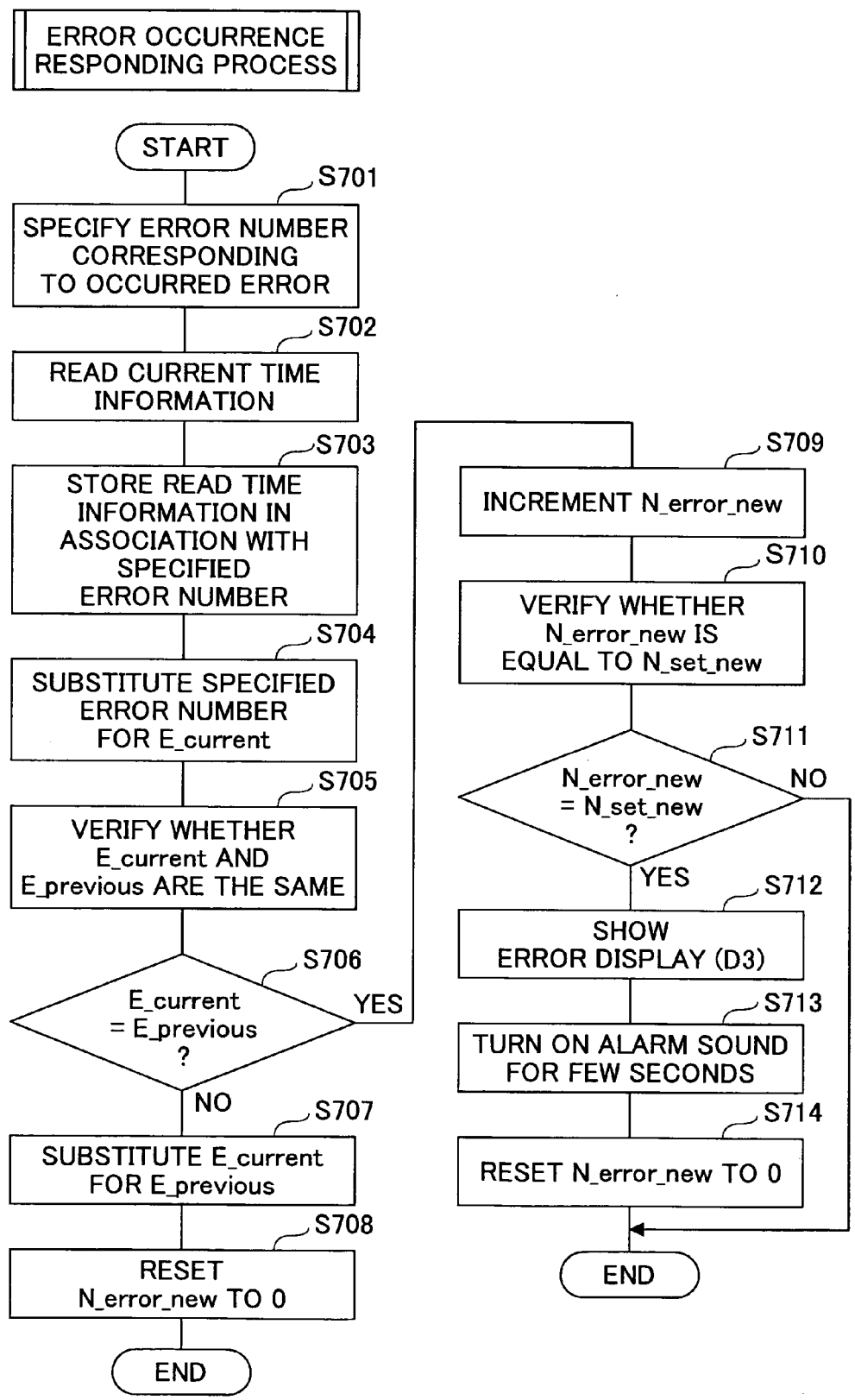
FIG. 23 is a flowchart illustrating specific processing procedures for realizing an error occurrence responding process according to the third embodiment.

FIG. 22 is a flowchart illustrating another example of specific processing procedures for realizing the network connection process corresponding to the process step S109 of FIG. 9.

In the network connection process of FIG. 22, first, network connection confirmation processes are performed between the POP server and the SMTP server (process S601), after which the transmission document data accumulated in the process step S108 of FIG. 9 are converted into MIME format and transmitted to the destination designated in the process step S106 (process S602), while received document data stored in the mail box for the present facsimile apparatus 1 that is provided in the POP server are obtained and accumulated in the accumulation memory 9 (process S603). The received document data accumulated in the process step S603 are output and printed in the process step S111 of FIG. 9.

Then, an inquiry is made into an error occurrence status detected by the network communication control unit 11, for example, in the sequence of network communication operations including the process steps S601, S602, and S603, that is, a verification regarding an error corresponding to each of the error numbers is conducted (process S604).

If it is determined from the process step S604 that no error has occurred (determination S605 NO), the variable 'N_error_new' is reset to 0 (process S606), and the variable 'E_previous' is reset to 0 (process S607).

If it is determined that an error has occurred (determination S605 YES), an error occurrence responding process is performed for the error number (error type) corresponding to the occurred error (process S608).

FIG. 23 is a flowchart illustrating an example of specific processing procedures for realizing the error occurrence responding process corresponding to the process step S608 of FIG. 22.

In the error occurrence responding process of FIG. 23, first, an error number corresponding to the occurred error is specified (process S701), and the current time and date information is read from the clock circuit 10 (process S702). Then, the current time and date information is associated with the specified error number (error type) to be stored in the error occurrence hysteresis storage unit 4g shown in FIG. 12 (process S703).

As is illustrated in FIG. 12, since the error number together with the error occurrence date/time of an error occurrence are accumulated in the error occurrence hysteresis storage unit 4g, an error hysteresis report may be easily created and output by referring to the error occurrence hysteresis storage unit 4g and the error number/error content character string storage unit 3a.

After the process step S703, the error number specified in the process step S701 is substituted as the variable 'E_current' (process S704), and a verification is made regarding the value of the variable 'E_current' and the value of the variable 'E_previous', that is, the previous error and the current error are referred to for comparison and verification (process S705).

If it is determined that the variables do not correspond to the same value (determination S706 NO), the value of the variable 'E_current' is substituted as the value of the variable 'E_previous' (process S707), and the variable 'N_error_new' is reset to 0 (process S708), after which the error occurrence responding process is ended.

If it is determined that the variables correspond to the same value (determination S706 YES), the counter variable 'N_error_new' is incremented (process S709), and a verification is made regarding the incremented variable 'N_error_new' and the variable 'N_set_new', that is, an occurrence number of a particular error and its corresponding predetermined threshold number are referred to for comparison and verification (process S710).

If it is determined that the variables do not correspond to the same value (determination S711 NO), this signifies that the successive occurrence number of the particular error has not yet reached its set threshold number, and thus, the process is ended.

Figure 24:
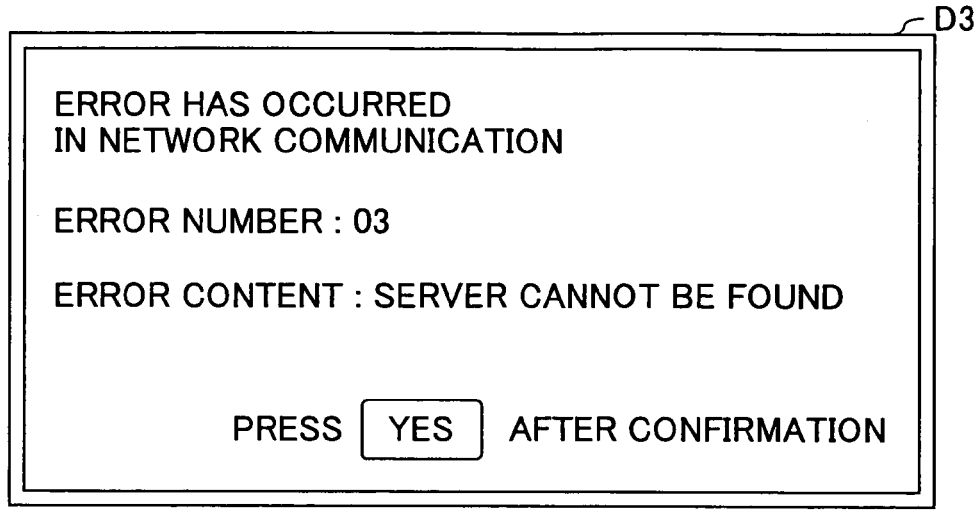
FIG. 24 is a diagram illustrating an example of an error indication that is displayed in the processing procedures of FIG. 23.

On the other hand, if it is determined that the variables correspond to the same value (determination S711 YES), an error indication such as a display D3 shown in FIG. 24 is displayed.

In the display D3 of FIG. 24, a message indicating that a network communication error has occurred, an error number (03), and an error content corresponding to the error number (SMTP server cannot be found) are displayed. This display indicates that a certain error (i.e., error corresponding to error number 03) has successively occurred for the number of times corresponding to the set threshold occurrence number.

The user may know that an error has occurred in the network communication upon seeing this display. In such case, the error that is being displayed has actually occurred successively for a number of times corresponding to the threshold occurrence number set as the variable 'N_set_new' (e.g., 4 times).

In this way, the present embodiment has been conceived in consideration of the fact that many errors occurring in network communications are easily restored in a short period of time. Taking this into consideration, a user is not notified each time an error occurs, and instead the user is notified when an error occurs successively so that the user is not distracted by frequent notification of irrelevant errors. Also, the error notification system may be easily adapted to various environments such as that where a particular error is prone to occur.

It is noted that the display D3 is displayed until the YES key 7b is pressed corresponding to an input representing recognition of the error occurrence on the user side. Also, in process step S713, an alarm sound is turned on for a few seconds at the speaker 13b. In this way, the user may be able to recognize a substantial error that is successively occurring.

Then, the variable 'N_error_new' is reset to 0 (process S714). In this way, the error indication D3 that is displayed in the process step S712 is prevented from being displayed again in a short period of time to distract the user.

In the following, processing procedures performed in the Internet facsimile apparatus 1 according to a fourth embodiment of the present invention are described.

Figure 25:
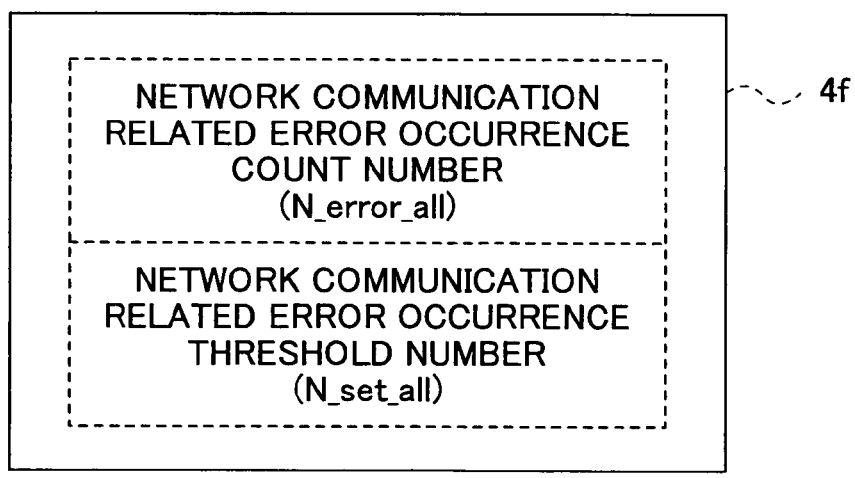
FIG. 25 is a diagram illustrating specific storage contents of another storage area of the RAM.

FIG. 25 is a diagram illustrating an example of specific storage contents of the storage area 4f that is referred to in the processing procedures according to the fourth embodiment.

As is shown in the drawing, the storage area 4f stores variables 'N_error_all' and 'N_set_all'. The variable 'N_error_all' corresponds to a counter variable representing an occurrence number of errors related to network communication. The variable 'N_set_all' corresponds to a variable representing a successive occurrence threshold number of errors relating to network communication.

The variable 'N_error_all' is reset to 0 by the initialization process performed in the process step S101 of FIG. 9.

The variable 'N_set_all' representing the successive occurrence threshold number of errors related to network communication may be set through a network communication related error successive occurrence threshold number setting procedure that is started by pressing the FUNCTION key 7f and inputting a number '50', for example, using the numeral keys 7a of the operations display unit 7 shown in FIG. 3 in which procedure the threshold number is set through an interactive inputting process using the display 7i. Alternatively, a remote setting scheme realized via a network may be used.

It is noted that the processing procedures according to the fourth embodiment follows the same procedures as those shown in FIG. 9 describing the first embodiment. However, in the present embodiment, processing procedures for realizing a network connection process as illustrated in FIG. 26 and an error occurrence responding process as illustrated in FIG. 27 are performed instead of the processing procedures of FIGS. 10 and 11 of the first embodiment.

Figure 26:
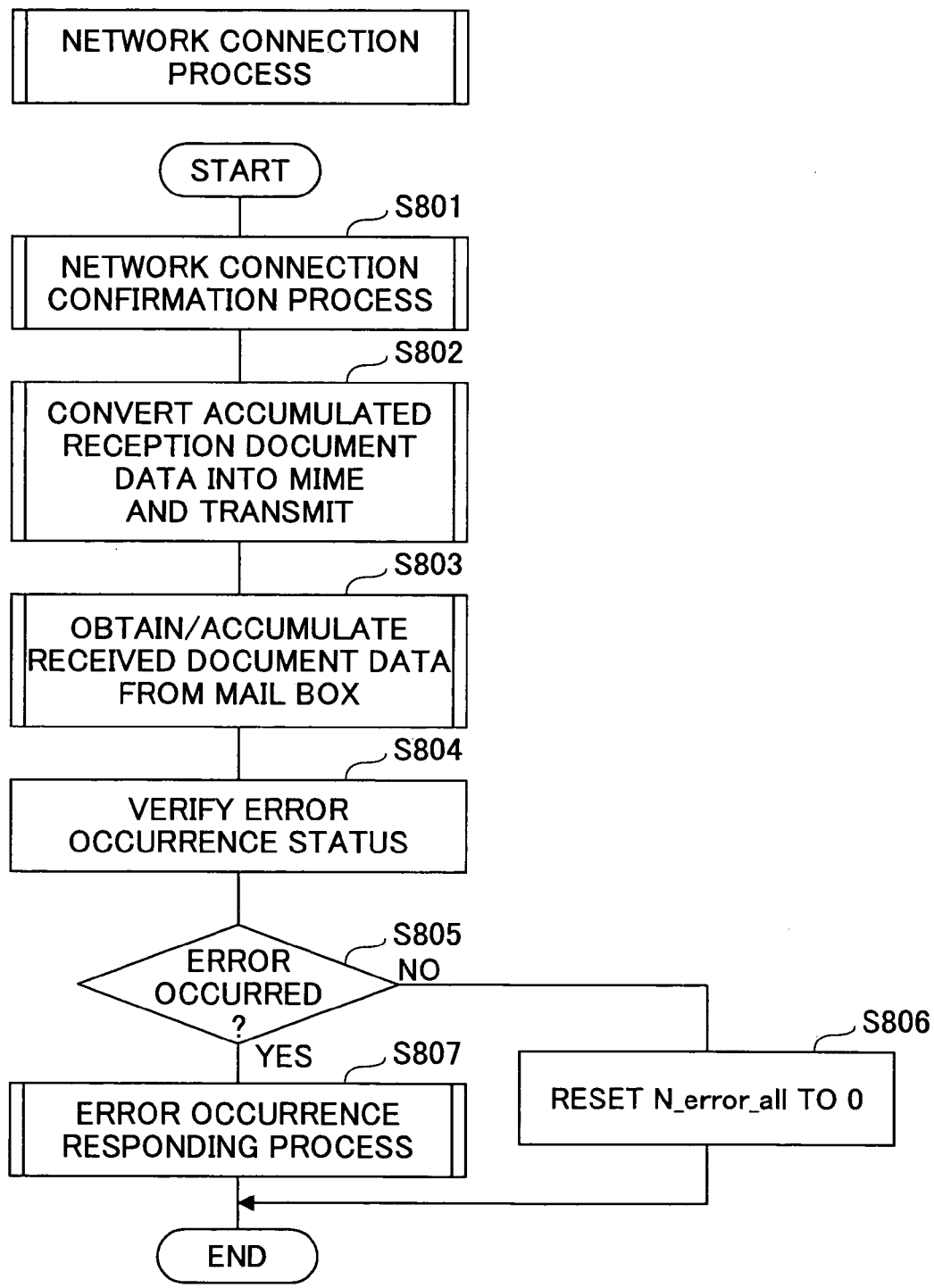
FIG. 26 is a flowchart illustrating specific processing procedures for realizing a network connection process according to the fourth embodiment.
Figure 27:
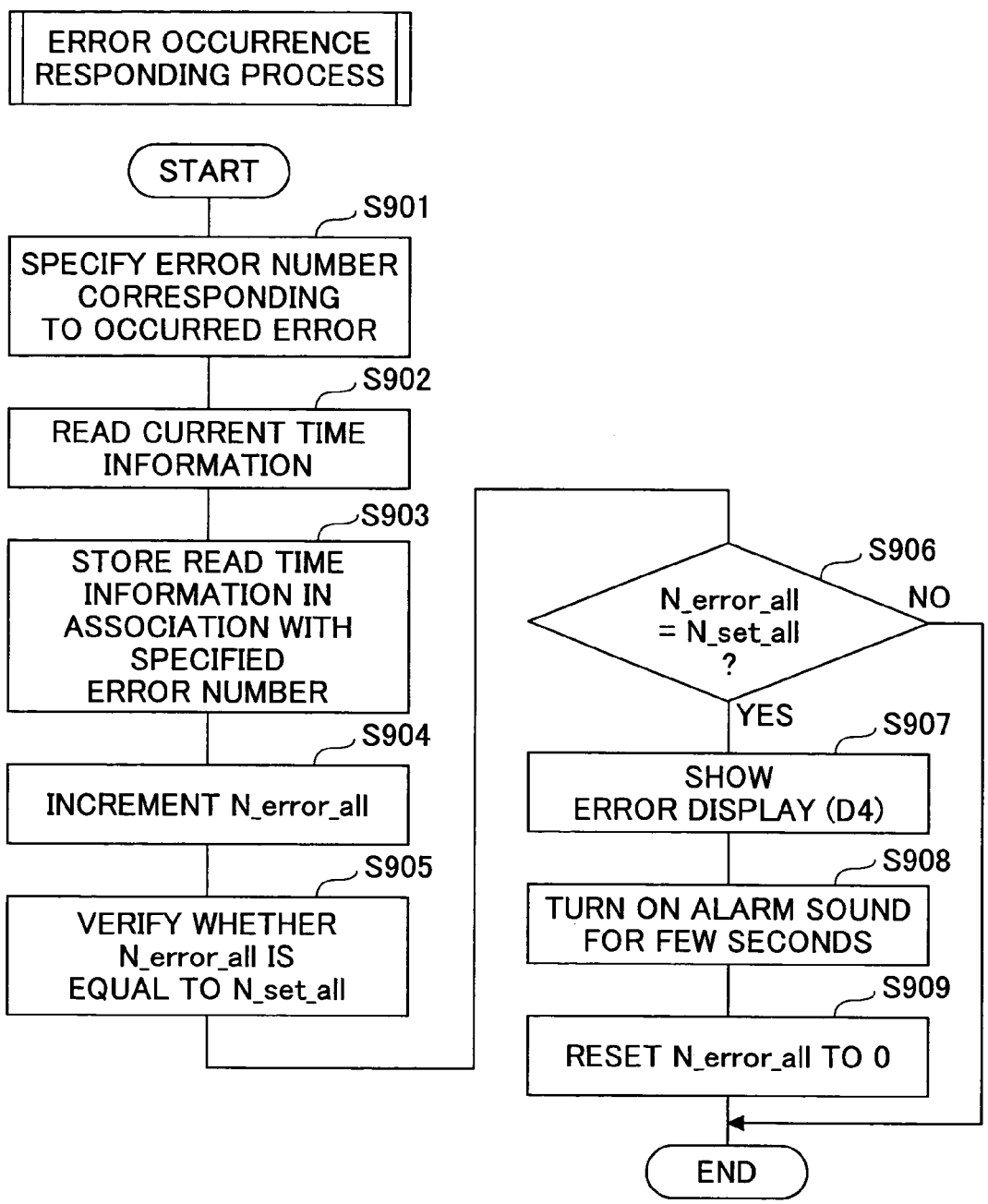
FIG. 27 is a flowchart illustrating specific processing procedures for realizing an error occurrence responding process according to the fourth embodiment.

FIG. 26 is a flowchart illustrating another example of specific processing procedures for realizing the network connection process corresponding to the process step S109 of FIG. 9.

In the network connection process of FIG. 26, first, network connection confirmation processes are performed between the POP server and the SMTP server (process S801), after which the transmission document data accumulated in the process step S108 of FIG. 9 are converted into MIME format and transmitted to the destination designated in the process step S106 (process S802), while received document data stored in the mail box for the present facsimile apparatus 1 that is provided in the POP server are obtained and accumulated in the accumulation memory 9 (process S803). The received document data accumulated in the process step S803 are output and printed in the process step S111 of FIG. 9.

Then, an inquiry is made into an error occurrence status detected by the network communication control unit 11, for example, in the sequence of network communication operations including the process steps S801, S802, and S803, that is, a verification is made regarding an error corresponding to each of the error numbers (process S804).

If it is determined from the process step S804 that no error has occurred (determination S805 NO), the variable 'N_error_all' is reset to 0 (process S806).

If it is determined that an error has occurred (determination S805 YES), an error occurrence responding process is performed for the error number (error type) corresponding to the occurred error (process S807).

FIG. 27 is a flowchart illustrating an example of specific processing procedures for realizing the error occurrence responding process corresponding to the process step S807 of FIG. 26.

In the error occurrence responding process of FIG. 27, first, an error number corresponding to the occurred error is specified (process S901), and the current time and date information is read from the clock circuit 10 (process S902). Then, the current time and date information is associated with the specified error number (error type) to be stored in the error occurrence hysteresis storage unit 4g shown in FIG. 12 (process S903).

As is illustrated in FIG. 12, since the error number together with the error occurrence date/time of an error occurrence are accumulated in the error occurrence hysteresis storage unit 4g, an error hysteresis report may be easily created and output by referring to the error occurrence hysteresis storage unit 4g and the error number/error content character string storage unit 3a.

After the process step S903, the variable 'N_error_all' is incremented (process S904), and a verification is conducted regoarding the incremented value of the variable 'N_error_all' and the variable 'N_set_all', that is, the successive occurrence number of arbitrary errors related to network communications and a predetermined threshold number are referred to for comparison and verification (process S905).

If it is determined that the variables do not correspond to the same value (determination S906 NO), this signifies that the successive occurrence number of errors related to network communications has not reached the set threshold number, and the process is hereby ended.

Figure 28:
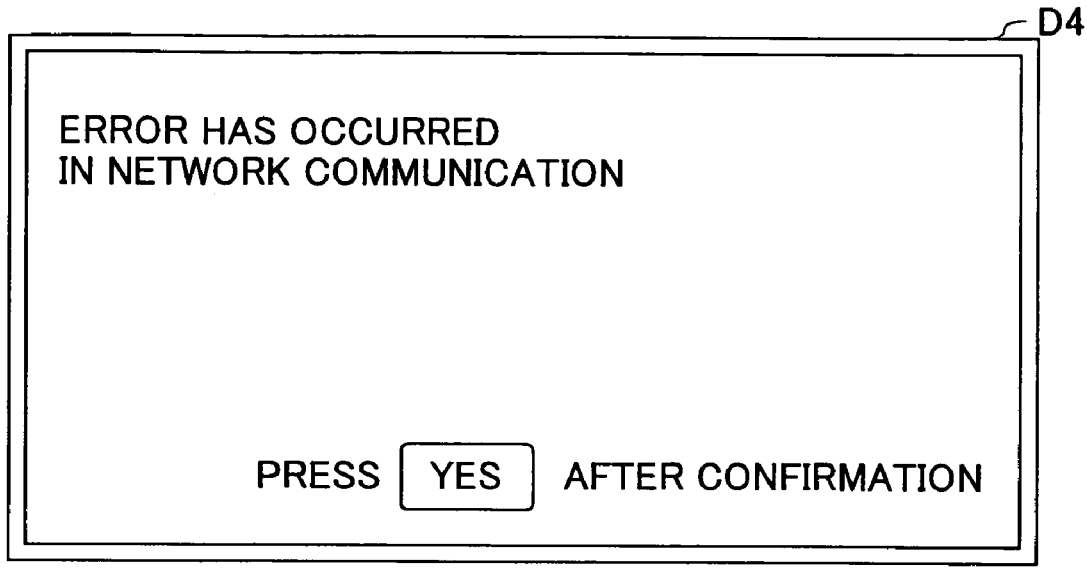
FIG. 28 is a diagram illustrating an example of an error indication that is displayed in the processing procedures of FIG. 24.

On the other hand, if it is determined that the variables correspond to the same value (determination S906 YES), an error indication such as a display D4 shown in FIG. 28 is displayed (process S907).

In the display D4 of FIG. 28, a message indicating that a network communication error has occurred is displayed.

The user may know that an error has occurred in the network communication upon seeing this display. In such case, the error indication actually indicates that errors have successively occurred for a number of times corresponding to the number set as the variable 'N_set_all' (e.g., 4 times).

The display D4 is displayed until the YES key 7b is pressed. Also, in process step S908, an alarm sound is turned on for a few seconds at the speaker 13b. In this way, the user may be made aware of a substantial error that is successively occurring. Then, the variable 'N_error_all' is reset to 0 in process step S909.

The present embodiment has been conceived with regard to the fact that many errors occurring in network communications are easily restored in a short period of time. Taking this into consideration, a user is not notified each time an error occurs, and instead the user is notified when an error occurs successively so that the user is not distracted by frequent notification of irrelevant errors.

It is noted that in the above descriptions of the preferred embodiments, applications of the present invention to an Internet facsimile apparatus corresponding to one type of network communication terminal apparatus are illustrated. However, the present invention is not limited to such embodiments, and variations and modifications may be made so long as a network is implemented between a communication terminal apparatus and a counterpart apparatus and communication is established through one or more servers. Also, the present invention may be applied generally to any communication terminal apparatus that is under a condition where non-fatal errors occur frequently, the occurrences of which do not necessarily have to be noted each time.

The present application is based on and claims the benefit of the earlier filing date of Japanese Patent Application No. 2003-037193 filed on Feb. 14, 2003, the entire contents of which are hereby incorporated by reference.

What is claimed is:

1. A network communication terminal apparatus that is adapted to exchange data with a counterpart apparatus via a network, and output an indication of an error occurrence that is to be recognized by a user when one or more of a plurality of types of errors relating to a network communication operation occur, the network communication terminal apparatus comprising:

an error group/threshold occurrence number setting unit for dividing the types of errors into a plurality or error groups by categorically grouping the types of errors and setting and storing, for each group of the error groups, a successive occurrence threshold number corresponding to a number of times one or more types of errors belonging to the error group are to occur successively before an indication of an error occurrence of the error group is output;

an error/occurrence number counting unit for counting, for each type of error, the number of successive occurrences of the type of error; and an error group occurrence output unit for outputting an indication of the error occurrence of a specified error group in a case where the successive occurrence number of each error group counted by the error/occurrence number counting unit, and the threshold occurrence number of each error group set by the error/threshold occurrence number setting unit are compared to find that the successive occurrence number of the specified error group is equal to the threshold occurrence number of the specified error group, wherein when an error of one error type of the plurality of types of errors occurs, the successive occurrence number of said one error type is incremented, and the successive occurrence numbers of remaining ones of the plurality of types of errors are reset.

2. The network terminal communication apparatus as claimed in claim 1, further comprising:

an error occurrence hysteresis storage unit for storing error occurrence hysteresis information for each of the types of errors; and an error occurrence hysteresis output unit for outputting the stored error occurrence hysteresis information.

3. A network communication terminal apparatus that is adapted to exchange data with a counterpart apparatus via a network, and output an indication of an error occurrence that is to be recognized by a user when one or more of a plurality of types of errors relating to a network communication operation occur, the network communication terminal apparatus comprising:

a specified error/threshold occurrence number setting unit for setting and storing a predetermined successive occurrence threshold number for a specified type of the types of errors, the predetermined successive occurrence number corresponding to a number of times the specified type of error is to occur successively before an indication of an error occurrence of the specified type of error is output;

a specified error/occurrence number counting unit for counting the number of successive occurrences of the specified type of error; and a specified error occurrence output unit for outputting the indication of the error occurrence of the specified type of error in a case where the successive occurrence number of the specified type of error counted by the specified error/occurrence number counting unit and the threshold occurrence number of the specifies type of error set by the specified error/threshold occurrence number setting unit are compared to find that the successive occurrence number is equal to the threshold occurrence number, wherein when an error of one error type of the plurality of types of errors occurs, the successive occurrence number of said one error type is incremented, and the successive occurrence numbers of remaining ones of the plurality of types of errors are reset.

4. The network terminal communication apparatus as claimed in claim 3, further comprising:

an error occurrence hysteresis storage unit for storing error occurrence hysteresis information for each of the types of errors; and an error occurrence hysteresis output unit for outputting the stored error occurrence hysteresis information.

5. A network communication terminal apparatus that is adapted to exchange data with a counterpart apparatus via a network, and output an indication of an error occurrence that is to be recognized by a user when one or more of a plurality of types of errors relating to a network communication operation occur, the network communication terminal apparatus comprising:

an unspecified error/threshold occurrence number setting unit for setting and storing a predetermined successive occurrence threshold number corresponding to a number of times unspecified types of the types of errors are to occur successively before the indication of the error occurrence is output;

an unspecified error/occurrence number counting unit for counting a number of successive occurrences of the unspecified types of errors; and an unspecified error occurrence output unit for outputting the indication of the error occurrence in a case where the successive occurrence number of the unspecified types of errors counted by the unspecified error/occurrence number counting unit and the threshold occurrence number of the unspecified types of errors set by the unspecified error/threshold occurrence number setting unit are compared to find that the successive occurrence number is equal to the threshold occurrence number, wherein when an error of one error type of the plurality of types of errors occurs, the successive occurrence number of said one error type is incremented, and the successive occurrence numbers of remaining ones of the plurality of types of errors are reset.

6. The network terminal communication apparatus as claimed in claim 5, further comprising:

an error occurrence hysteresis storage unit for storing error occurrence hysteresis information for each of the types of errors; and an error occurrence hysteresis output unit for outputting the stored error occurrence hysteresis information.

7. A method of providing an error occurrence indication to a user in a network communication terminal apparatus that is adapted to exchange data with a counterpart apparatus via a network, the error occurrence indication being output when one or more of a plurality of types of errors relating to a network communication operation occur, the method comprising:

counting a number of successive occurrences of a specified type of error to maintain the successive occurrence count number of the specified type of error;

comparing a successive occurrence count number and a predetermined threshold occurrence number of each of error groups into which the types of errors are categorically grouped; and outputting an error occurrence indication of a specified error group of which the successive occurrence count number is determined to be equal to the predetermined threshold occurrence number in the comparing step, wherein when an error of one error type of the plurality of types of errors occurs, the successive occurrence number of said one error type is incremented, and the successive occurrence numbers of remaining ones of the plurality of types of errors are reset.

8. A method of providing an error occurrence indication to a user in a network communication terminal apparatus that is adapted to exchange data with a counterpart apparatus via a network, the error occurrence indication being output when one or more of a plurality of types of errors relating to a network communication operation occur, the method comprising:

counting a number of successive occurrences of a specified type of error to maintain the successive occurrence count number of the specified type of error;

comparing a successive occurrence count number and a predetermined threshold occurrence number of a specified type of error; and outputting an error occurrence indication of the specified type of error when it is determined in the comparing step that the successive occurrence count number is equal to the predetermined threshold occurrence number, wherein when an error of one error type of the plurality of types of errors occurs, the successive occurrence number of said one error type is incremented, and the successive occurrence numbers of remaining ones of the plurality of types of errors are reset.

9. A method of providing an error occurrence indication to a user in a network communication terminal apparatus that is adapted to exchange data with a counterpart apparatus via a network, the error occurrence indication being output when one or more errors relating to a network communication operation occur, the method comprising:

counting a number of successive occurrences of a specified type of error to maintain the successive occurrence count number of the specified type of error;

comparing a successive occurrence count number and a predetermined threshold occurrence number of the errors; and outputting the error occurrence indication when it is determined in the comparing step that the successive occurrence count number is equal to the predetermined threshold occurrence number, wherein when an error of one error type of the plurality of types of errors occurs, the successive occurrence number of said one error type is incremented, and the successive occurrence numbers of remaining ones of the plurality of types of errors are reset.

10. A method of providing an error occurrence indication to a user in a network communication terminal apparatus that is adapted to exchange data with a counterpart apparatus via a network, the error occurrence indication being output when one or more of a plurality of types of errors relating to a network communication operation occurs, the method comprising:

comparing a successive occurrence count number and a predetermined threshold occurrence number of each of the types of errors;

outputting an error occurrence indication of a specified type of error of which the successive occurrence count number is determined to be equal to the predetermined threshold occurrence number in the comparing step; and counting a number of successive occurrences of the specified type of error to maintain the successive occurrence count number of the specified type of error, wherein when an error of one error type of the plurality of types of errors occurs, the successive occurrence number of said one error type is incremented, and the successive occurrence numbers of remaining ones of the plurality of types of errors are reset.

11. A network terminal communication apparatus that is adapted to exchange data with a counterpart apparatus via a network, and output an indication of an error occurrence that is to be recognized by a user when one or more of a plurality of types of errors relating to a network communication operation occur, the network communication terminal apparatus comprising:

an error/threshold occurrence number setting unit for setting and storing, for each type of the types of errors, a successive occurrence threshold number corresponding to a number of times the type of error is to occur successively before an indication of an error occurrence of the type of error is output;

an error/occurrence number counting unit for counting, for each type of the types of errors, the number of successive occurrences of the type of error; and an error occurrence output unit for outputting an indication of the error occurrence of a specified type of error in a case where the successive occurrence number of each type of error counted by the error/occurrence number counting unit and the threshold occurrence number of each type of error set by the error/threshold occurrence number setting unit are compared to find that the successive occurrence number of the specified type of error is equal to the threshold occurrence number of the specified type of error, wherein when an error of one error type of the plurality of types of errors occurs, the successive occurrence number of said one error type is incremented, and the successive occurrence numbers of remaining ones of the plurality of types of errors are reset.

12. The network terminal communication apparatus as claimed in claim 11, further comprising:

an error occurrence hysteresis storage unit for storing error occurrence hysteresis information for each of the types of errors; and an error occurrence, hysteresis output unit for outputting the stored error occurrence hysteresis information.

* * * * *